US010602407B2

(12) United States Patent
Uzawa et al.

(10) Patent No.: US 10,602,407 B2
(45) Date of Patent: Mar. 24, 2020

(54) RADIO NETWORK SYSTEM

(71) Applicant: NIPPON TELEGRAPH AND TELEPHONE CORPORATION, Tokyo (JP)

(72) Inventors: Hiroyuki Uzawa, Tokyo (JP); Yuki Arikawa, Tokyo (JP); Kenji Kawai, Tokyo (JP); Satoshi Shigematsu, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 285 days.

(21) Appl. No.: 15/739,677

(22) PCT Filed: Jun. 22, 2016

(86) PCT No.: PCT/JP2016/068491
§ 371 (c)(1),
(2) Date: Dec. 22, 2017

(87) PCT Pub. No.: WO2016/208614
PCT Pub. Date: Dec. 29, 2016

(65) Prior Publication Data
US 2018/0192328 A1  Jul. 5, 2018

(30) Foreign Application Priority Data

Jun. 24, 2015 (JP) ................. 2015-126844

(51) Int. Cl.
*H04W 28/14* (2009.01)
*H04L 12/44* (2006.01)
(Continued)

(52) U.S. Cl.
CPC ......... *H04W 28/14* (2013.01); *H04J 14/0246* (2013.01); *H04L 12/44* (2013.01);
(Continued)

(58) Field of Classification Search
CPC ... H04W 28/14; H04W 72/042; H04W 88/08; H04W 72/1289; H04J 14/0246; H04J 14/08; H04L 12/44; H04Q 11/0067
See application file for complete search history.

(56) References Cited

U.S. PATENT DOCUMENTS 10,009,803 B2    6/2018  Dahod
2014/0031049 A1  1/2014  Sundaresan et al.
(Continued)

FOREIGN PATENT DOCUMENTS

EP    2574138 A1      3/2013
JP    2016-510578 A   4/2016
(Continued)

OTHER PUBLICATIONS

Taoka et al., "MIMO and CoMP in LTE-Advanced", NTT Docomo, Technology Journal, vol. 12, No. 2, 2010, pp. 20-28.
(Continued)

*Primary Examiner* — Ian N Moore
*Assistant Examiner* — Latresa A McCallum
(74) *Attorney, Agent, or Firm* — Womble Bond Dickinson (US) LLP

(57) ABSTRACT

A CU (Central Unit) executes scheduling for allocating radio resources of RRUs (Remote Radio Units) to radio transmission of downlink data while broadcasting, to DMs (Data Managers) via MFH, downlink data from MBH. Each DM selects, based on an allocation result obtained by scheduling, the downlink data of an RRU (Remote Radio Unit) corresponding to the self DM from the accumulated downlink data from the CU, and transfers the selected downlink data to the corresponding RRU while discarding the downlink data of other RRUs. Based on the allocation result, each RRU performs radio transmission of the downlink data from the DM to a corresponding UE (User Equipment) using the
(Continued)

designated radio resource. This makes it possible to efficiently transfer the downlink data from the CU to each RRU via the MFH constructed by a TDM system represented by TDM-PON.

12 Claims, 16 Drawing Sheets

(51) Int. Cl.
    *H04W 88/08*    (2009.01)
    *H04J 14/02*     (2006.01)
    *H04W 72/04*    (2009.01)
    *H04J 14/08*     (2006.01)
    *H04Q 11/00*    (2006.01)
    *H04W 72/12*    (2009.01)

(52) U.S. Cl.
    CPC ......... *H04W 72/042* (2013.01); *H04W 88/08* (2013.01); *H04J 14/08* (2013.01); *H04Q 11/0067* (2013.01); *H04W 72/1289* (2013.01)

(56) References Cited

U.S. PATENT DOCUMENTS

2014/0226481 A1    8/2014   Dahod et al.
2014/0341144 A1*  11/2014  Zhang ................... H04L 5/006
                                           370/329

FOREIGN PATENT DOCUMENTS

WO    2014/127054 A1    8/2014
WO    2015/044871 A1    4/2015

OTHER PUBLICATIONS

Supplementary European Search Report and Written Opinion received for EP Patent Application No. 16814384.0, dated Dec. 10, 2018, 5 pages.

Miyamoto et al., "Split-PHY processing architecture to realize base station coordination and transmission bandwidth reduction in mobile fronthaul", Optical Fiber Communication Conference, Optical Society of America, 2015, 3 pages. (M2J.4).

Miyamoto et al., "A Study on Optical Transmission Bandwidth for Future Mobile Fronthaul Based on PON System", The Institute of Electronics, Information and Communication Engineers, IEICE Technical Report, CS2014-18, 2014, pp. 7-12 (English Abstract Submitted).

Matsunaga, Yasuhiko, "Radio Access Network Architecture Evolution toward 5G", The Institute of Electronics, Information and Communication Engineers, IEICE Technical Report, RCS2014-172, 2014, pp. 89-94 (English Abstract Submitted).

International Search Report and Written Opinion received for PCT Patent Application No. PCT/JP2016/068491, dated Jul. 26, 2016, 11 pages (5 pages of English Translation and 6 pages of Original Document).

International Preliminary Report on Patentability received for PCT Patent Application No. PCT/JP2016/068491, dated Jan. 4, 2018, 10 pages (6 page of English Translation and 4 pages of Original Document).

China Mobile Research Institute et al., "White Paper of Next Generation Fronthaul Interface", Version 1.0, Jun. 4, 2015, 42 pages.

3GPP, "3GPP, TS 36.213", 3rd Generation Partnership Project, Technical Specification, Version 8.2.0, 2008, pp. 1-30.

* cited by examiner

RADIO NETWORK SYSTEM

TECHNICAL FIELD

The present invention relates to a data transfer technique and, more particularly, to a data transfer technique for transferring downlink data destined for a user terminal from a central unit forming a radio network system to a plurality of remote radio units.

BACKGROUND ART

In recent years, in a radio network system, high-density arrangement of small cells to accommodate suddenly increasing mobile traffic has been examined. Since the small cell has a cell radius smaller than that of a macro cell, the number of user terminals that share the same frequency within the cell can be reduced, thereby improving the throughput of each of the user terminals.

On the other hand, high-density arrangement of small cells increases interference power from an adjacent cell. Assume, for example, that a plurality of cells simultaneously transmit downlink data to different user terminals using the same frequency band. For each user terminal, transmission signals from cells other than a cell that transmits the downlink data destined for the user terminal act as interference power to a desired reception signal, thereby unwantedly decreasing the throughput. To solve this problem, cooperative transmission of the cells is required to suppress interference particularly in a downlink that requires high throughput (non-patent literature 1).

FIG. 20 shows an arrangement formed from one CU (Central Unit) and a plurality of RRUs (Remote Radio Units). At least one or more RRUs are installed in each cell and connected to the one CU via optical fibers (non-patent literature 2). Especially, an optical fiber network that connects the CU and the RRUs is generally called MFH (Mobile Front-Haul).

The CU includes a radio scheduler for centrally allocating the radio resources of the respective RRUs for cooperative transmission of the RRUs. Each RRU has, for example, at least a layer-1 function responsible for signal processing such as modulation/demodulation.

As shown in FIG. 21, the CU performs scheduling for collectively allocating the radio resources of the RRUs to radio transmission of downlink data to perform radio transmission, from the respective RRUs, of the downlink data destined for the UEs received from MBH (Mobile Back-Haul) as a host network. Upon completion of scheduling, the CU transfers each downlink data to the RRU serving as a radio transmission source via the MFH based on an allocation result. The transferred downlink data undergoes baseband processing (layer-1 processing) in the RRU, and is then transmitted to the corresponding UE. When transferring each downlink data to the RRU via the MFH, the CU encapsulates the data based on, for example, the Ethernet® standard, and then transfers it.

In the downlink data transfer processing, the radio transmission destination UEs and radio transmission data amounts of all the RRUs are determined by scheduling in the CU. Consequently, the downlink data to be transferred and their data amounts are not determined before completion of scheduling, and the CU needs to wait for completion of scheduling to start transfer of the downlink data to each RRU, as shown in FIG. 21. On the other hand, transfer of the downlink data to each RRU needs to be completed before the start time of baseband processing in the RRU. This is because resource mapping as part of the baseband processing requires all downlink data whose radio transmission source is the RRU.

Therefore, a period that can be used for downlink data transfer via the MFH, that is, an MFH transferable period is limited to a period from completion of scheduling to the start of the baseband processing. Thus, to economize the MFH by sharing an apparatus or optical fiber core, in arrangements (non-patent literatures 3 and 4) in which a plurality of RRUs are multiplexed by TDM using TDM-PON (Time Division Multiplexing-Passive Optical Network) or a line concentration switch, the MFH transferable period is time-divisionally used by all the multiplexed RRUs, and thus the MFH transferable period of each RRU is shorter, thereby imposing a problem that there may be downlink data which cannot be transferred from the CU to the RRU.

RELATED ART LITERATURE

Non-Patent Literature

Non-Patent Literature 1: Taoka, et al., "MIMO and inter-cell cooperative transmission and reception technology in LTE-Advanced", NTT DOCOMO Technical Journal, Vol. 18, No. 2, July 2010

Non-Patent Literature 2: Matsunaga, et al., "Radio Access Network Architecture Evolution toward 5G", IEICE technical report, RCS2014-172, October 2014

Non-Patent Literature 3: Miyamoto, et al., "A Study on Optical Transmission Bandwidth for Future Mobile Fronthaul Based on PON System", IEICE technical report, CS2014-018, 2014

Non-Patent Literature 4: China Mobile Research Institute, et al., "White Paper of Next Generation Fronthaul Interface ver 1.0", Oct. 4, 2015

Non-Patent Literature 5: 3GPP, TS 36.213 V.8.2.0

DISCLOSURE OF INVENTION

Problem to be Solved by the Invention

The present invention has been made in consideration of the above problem, and has as its object to provide a data transfer technique capable of efficiently transferring downlink data from a central unit to respective remote radios unit via MFH constructed by a TDM system represented by TDM-PON.

Means of Solution to the Problem

In order to achieve the above object of the present invention, there is provided a radio network system comprising a central unit, a plurality of data managers connected to the central unit, and at least one remote radio unit that is connected in correspondence with each of the data managers and performs radio communication with a corresponding user terminal, the central unit comprising a data broadcasting unit that broadcasts, to the data managers via mobile front-haul, downlink data destined for the user terminals received from a host network, and a scheduling unit that executes scheduling for allocating radio resources of the remote radio units to radio transmission of the downlink data simultaneously with broadcasting of the downlink data, each data manager comprising a data accumulation unit that temporarily accumulates the downlink data broadcast from the central unit, and a data selection unit that selects, based on an allocation result obtained by the scheduling, downlink data allocated to the radio resource of the remote radio unit corresponding to the self data manager among the remote radio units from the downlink data accumulated in the data accumulation unit and transfers the selected downlink data to the corresponding remote radio unit while discarding, from the data accumulation unit, the downlink data allocated to the radio resources of the remote radio units other than the corresponding remote radio unit, and each remote radio unit comprising a radio transmission unit that performs, based on the allocation result obtained by the scheduling, radio transmission of the downlink data transferred from the data manager to the corresponding user terminal using the designated radio resource.

Effect of the Invention

According to the present invention, unlike the conventional technique, the transfer start timing of downlink data via MFH is not limited to the timing after completion of scheduling in a central unit. Thus, downlink data transfer starts even during scheduling in the central unit, and each downlink data is transferred from the central unit to a user terminal as a destination simultaneously with scheduling. Therefore, a period that can be used for downlink data transfer via MFH is significantly extended, and thus the effective bandwidth of the MFH is extended, thereby making it possible to extremely efficiently transfer downlink data from the central unit to each remote radio unit.

BEST MODE FOR CARRYING OUT THE INVENTION

Embodiments of the present invention will be described next with reference to the accompanying drawings.

First Embodiment

A radio network system 1 according to the first embodiment of the present invention will be described with reference to FIG. 1.

Figure 1:
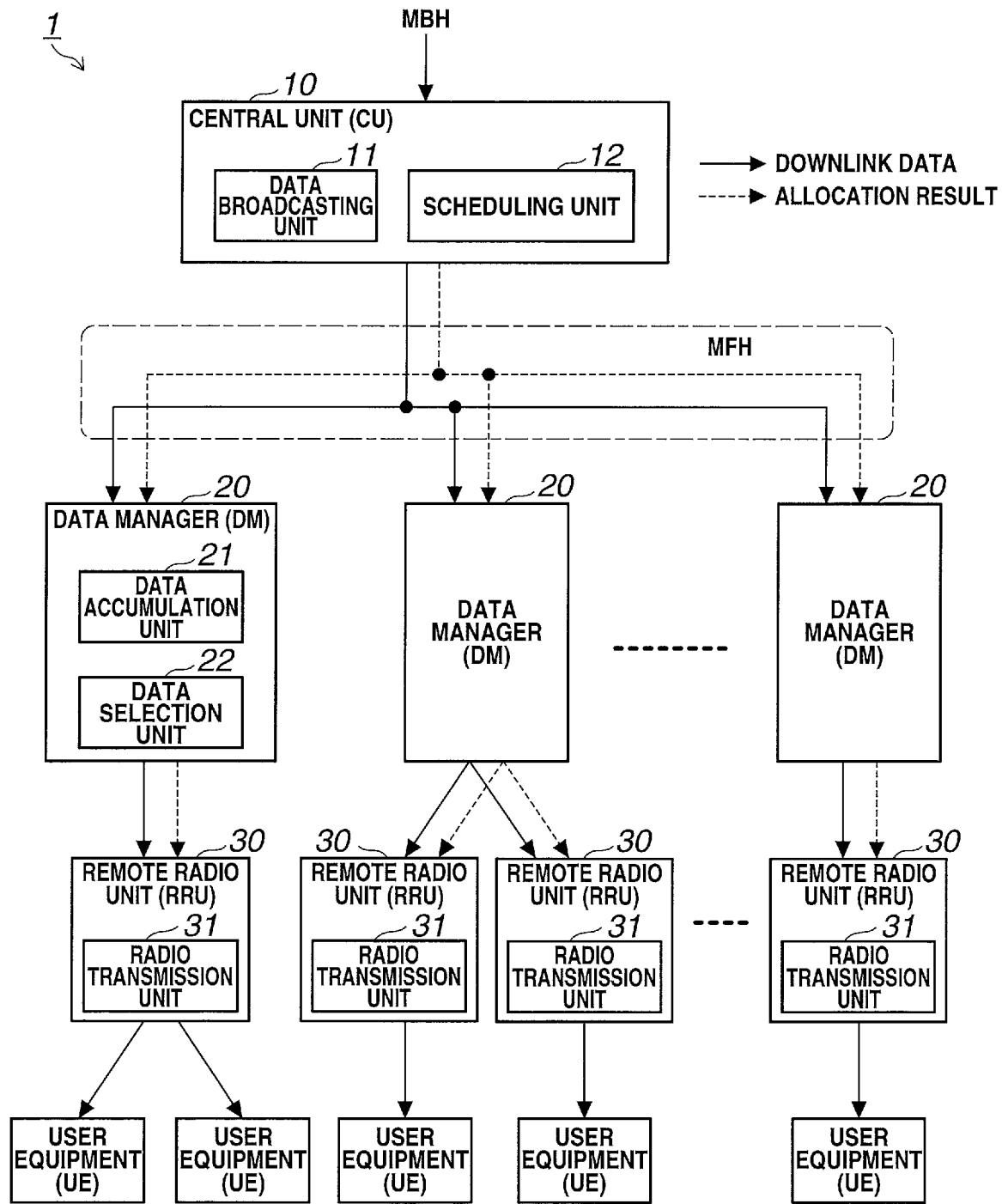
FIG. 1 is a block diagram showing the configuration of a radio network system according to the first embodiment.

As shown in FIG. 1, the radio network system 1 includes one CU (Central Unit: radio base station/radio scheduler) 10 connected to MBH (Mobile Back-Haul) as a host network, a plurality of DMs (Data Managers) 20 connected to the CU via MFH (Mobile Front-Haul) such as a TDM-PON (Time Division Multiplexing-Passive Optical Network) system, and a plurality of RRUs (Remote Radio Units) 30. One or a plurality of RRUs are connected to each DM and each RRU performs radio transmission to one or a plurality of UEs (User Equipments: radio terminals).

Based on this arrangement, the radio network system 1 has a function of broadcasting, from the CU to the DMs via the MFH, downlink data (user data) destined for the respective UEs received from the MBH while allocating the radio resources of the RRUs to radio transmission of the downlink data, selecting, from the downlink data received by each DM, downlink data allocated to the radio resources of the RRUs corresponding to the DM, transferring the downlink data to the RRUs, and performing radio transmission, to the corresponding UE, of each downlink data received by each RRU from the DM.

Note that in this embodiment, the downlink data broadcast from the CU to the DMs via the MFH are data before forming radio frames, for example, PDCP-PDU (Packet Data Convergence Protocol-Protocol Data Unit/non-patent literature 4) or arranged data of a predetermined amount.

The CU 10 is provided with a data broadcasting unit 11 and a scheduling unit 12 as main functional units.

The data broadcasting unit 11 has a function of broadcasting, to the respective DMs via the MFH, downlink data destined for the respective UEs received from the MBH.

The scheduling unit 12 has a function of executing scheduling for allocating the radio resources of the RRUs to radio transmission of the downlink data simultaneously with broadcasting of the downlink data by the data broadcasting unit 11.

Each DM 20 is provided with a data accumulation unit 21 and a data selection unit 22 as main functional units.

The data accumulation unit 21 is formed from a data buffer as a whole, and has a function of temporarily accumulating the downlink data broadcast from the CU.

The data selection unit 22 has a function of selecting, based on the allocation result obtained by scheduling in the CU, from the downlink data accumulated in the data accumulation unit 21, the downlink data allocated to the radio resources of the RRUs corresponding to the DM among the RRUs, that is, the corresponding RRUs located under the DM, and transferring the selected downlink data to the corresponding RRUs, and a function of discarding, from the data accumulation unit 21, the downlink data allocated to the radio resources of the RRUs other than the corresponding ones, that is, the RRUs located under the DMs other than this DM.

Each RRU 30 is provided with a radio transmission unit 31 as a main functional unit.

The radio transmission unit 31 has a function of performing, based on the allocation result obtained by scheduling in the CU, radio transmission of the downlink data transferred from the DM to the corresponding UEs using the designated radio resource.

Note that this embodiment assumes a case in which each DM is formed by a standalone apparatus. A system configuration in which the DMs are connected between the MFH and the RRUs will be exemplified. However, the radio network system 1 according to the present invention is not limited to this. For example, a system configuration in which a DM formed by a circuit unit is implemented in an ONU (Optical Network Unit) constituting the MFH formed by the TDM-PON system, as in the second embodiment (to be described later), or a system configuration in which a DM formed by a circuit unit is implemented in an RRU, as in the fourth embodiment (to be described later), may be adopted.

[Detailed Arrangement of CU]

An example of the detailed arrangement of the CU will be described next with reference to FIG. 2.

The CU is provided with the data broadcasting unit 11, the scheduling unit 12, and a broadcasting control unit 13 as main functional units.

The data broadcasting unit 11 has a function of broadcasting, to the respective DMs via the MFH, downlink data destined for the respective UEs received from the MBH.

The data broadcasting unit 11 is provided with a manipulation processing unit 11A, a data buffer 11B, and a tag assignment unit 11C as main processing units.

The manipulation processing unit 11A has a function of performing manipulation processing such as encryption for the downlink data received from the MBH.

The data buffer 11B has a function of temporarily accumulating the downlink data manipulated by the manipulation processing unit 11A in UE-specific buffers for the respective destination UEs.

The tag assignment unit 11C has a function of assigning, to each of the downlink data acquired from the UE-specific buffers of the data buffer 11B in a predetermined order, a tag indicating the destination UE and data length of the downlink data, and broadcasting the downlink data from the broadcasting control unit 13 to the respective RRUs.

The scheduling unit 12 has a function of executing scheduling for allocating the radio resources of the RRUs to radio transmission of the downlink data simultaneously with broadcasting of the downlink data by the data broadcasting unit 11.

The broadcasting control unit 13 has a function of encapsulating, based on, for example, the Ethernet standard, the downlink data output from the data broadcasting unit 11 or the allocation result output from the scheduling unit 12 upon completion of scheduling, and broadcasting the data to all the RRUs via the MFH, and a function of prioritizing the allocation result when arbitrating between the downlink data and the allocation result.

[Detailed Arrangement of DM]

An example of the detailed arrangement of each DM will be described next with reference to FIG. 3.

The DM is provided with the data accumulation unit 21, the data selection unit 22, a data sorting unit 23, an allocation result analysis unit 24, and a transfer processing unit 25 as main functional units.

The data accumulation unit 21 is formed from the data buffer as a whole, and has a function of temporarily accumulating each downlink data broadcast from the CU in a UE-specific buffer corresponding to the destination UE described in the tag of the downlink data.

The data selection unit 22 has a function of selecting, based on an analysis result obtained by the allocation result analysis unit 24, the downlink data accumulated in the UE-specific buffers corresponding to the RRUs corresponding to the DM, that is, the corresponding RRUs located under the DM, among the UE-specific buffers of the data accumulation unit 21, and transferring the downlink data to the corresponding RRUs, and a function of discarding the downlink data accumulated in the UE-specific buffers corresponding to the RRUs other than the corresponding ones, that is, the RRUs located under the DMs other than the DM.

The data sorting unit 23 has a function of outputting, if the data received from the CU via the MFH is the downlink data, the data to the data accumulation unit 21, and outputting, if the received data is the allocation result, the data to the allocation result analysis unit 24.

The allocation result analysis unit 24 has a function of analyzing the allocation result from the data sorting unit 23 and extracting an analysis result including the destination UE and radio transmission data amount of each corresponding downlink data.

The transfer processing unit 25 has a function of transferring the downlink data selected by the data selection unit 22 and the allocation result received from the CU (or the analysis result obtained by the allocation result analysis unit 24) to the corresponding RRUs located under the DM.

[Detailed Arrangement of RRU]

An example of the detailed arrangement of each RRU will be described next with reference to FIG. 4.

The RRU is provided with a frame formation unit 32, a baseband processing unit 33, and the radio transmission unit 31 as main functional units.

The frame formation unit 32 has a function of forming, based on the allocation result (or analysis result) transferred from the DM, a radio frame storing the downlink data transferred from the DM for each destination UE.

The baseband processing unit 33 has a function of generating baseband data of layer 1 by performing baseband processing for the radio frame output from the frame formation unit 32.

The radio transmission unit 31 has a function of performing radio transmission of the baseband data output from the baseband processing unit 33 to the corresponding UE using the designated radio resource.

Note that the frame formation unit 32 may be implemented on the DM side, and then the DM may transfer the radio frame to the RRU and the RRU may perform baseband processing for the received radio frame.

[Operation of First Embodiment]

The operation of the radio network system 1 according to this embodiment will be described next with reference to FIGS. 5 and 6.

Figure 5:
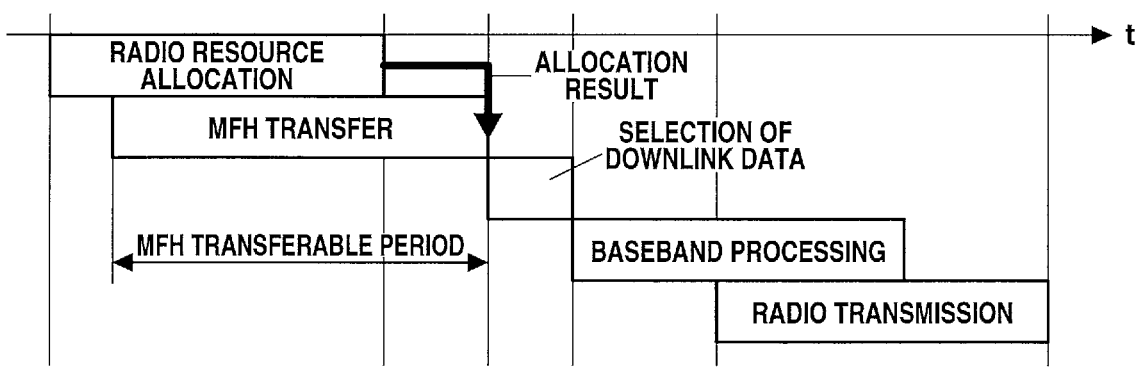
FIG. 5 is a timing chart for explaining an outline of a data transfer operation according to the first embodiment.
Figure 6:
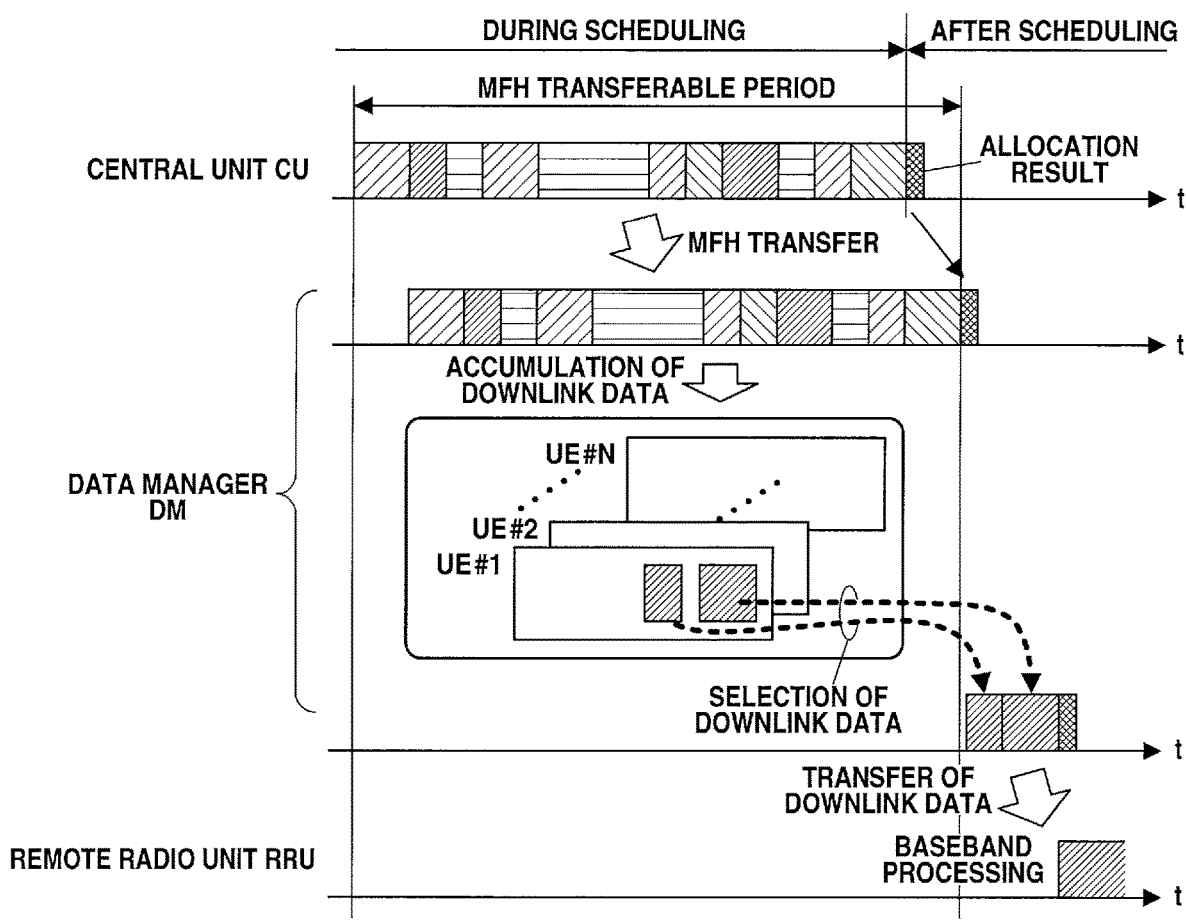
FIG. 6 is a timing chart showing an example of the data transfer operation according to the first embodiment.

As shown in FIGS. 5 and 6, in this embodiment, the downlink data received by the CU from the MBH are broadcast (MFH-transferred) from the data broadcasting unit 11 of the CU to all the DMs via the MFH regardless of the destinations of the data without waiting for completion of radio resource allocation to the downlink data by the scheduling unit 12.

Based on the destination UEs, the downlink data are temporarily accumulated in the UE-specific buffers (UE #1, UE #2, . . . , UE # N) provided in the data accumulation unit 21 of the DM. Based on the allocation result sent from the CU upon completion of radio resource allocation, the data selection unit 22 of the DM selects, from the corresponding UE-specific buffers, only the downlink data to undergo radio transmission from the corresponding RRUs located under the DM, and transfers the selected data to the corresponding RRUs. The data selection unit 22 discards, from the corresponding UE-specific buffers, the downlink data to undergo radio transmission from the RRUs under other DMs.

After that, each RRU stores the downlink data selected by the data selection unit 22 in the payload of a radio frame assigned with a header indicating the destination UE, performs baseband processing, and then performs radio transmission from the radio transmission unit 31 to the corresponding UE under the RRU.

Effect of First Embodiment

As described above, in this embodiment, the CU executes scheduling for allocating the radio resources of the respective RRUs to radio transmission of the downlink data while broadcasting, to the DMs via the MFH, the downlink data from MBH, each DM selects, based on the allocation result of scheduling, the downlink data for the RRUs corresponding to the DM from the accumulated downlink data obtained from the CU and transfers the selected data to the corresponding RRUs while discarding the downlink data for other RRUs, and each RRU performs radio transmission of the downlink data from the DM to the corresponding UEs using the designated radio resource based on the allocation result.

According to this embodiment, this arrangement prevents the transfer start timing of the downlink data via the MFH from being limited to the timing after completion of scheduling in the CU, unlike the conventional technique. Thus, downlink data transfer starts even during scheduling in the CU, and each downlink data is transferred from the CU to the destination UE simultaneously with scheduling. Therefore, a period that can be used for downlink data transfer via the MFH is significantly extended, and thus the effective bandwidth of the MFH is extended, thereby making it possible to extremely efficiently transfer the downlink data from the CU to each RRU.

In addition, according to this embodiment, after all the downlink data are broadcast from the CU to all the DMs regardless of the destinations of the data, radio resource allocation is completed. At the time of completion of radio resource allocation, the downlink data are already accumulated in the DMs. Therefore, upon completion of radio resource allocation, each RRU can start baseband processing, thereby largely reducing the time required from reception of the downlink data from the MBH to transmission of radio frames to the UEs.

In this embodiment, when broadcasting each downlink data, the data broadcasting unit 11 of the CU may broadcast the downlink data added with a tag for identifying the destination UE of the downlink data. When accumulating the downlink data, the data accumulation unit 21 of each DM may accumulate, based on the tag assigned to the downlink data, in the UE-specific buffer corresponding to the tag, the downlink data from which the tag has been removed, and the data selection unit 22 may select the downlink data accumulated in the UE-specific buffers corresponding to the corresponding RRUs among the UE-specific buffers and transfer the selected data to the corresponding RRUs while discarding the downlink data accumulated in the UE-specific buffers corresponding to the RRUs other than the corresponding RRUs.

With this arrangement, even if the manipulation processing unit 11A of the CU encrypts the downlink data, each DM can readily identify the destination UEs of the received downlink data based on the tags assigned to the downlink data.

Upon receiving the downlink data, each DM classifies the downlink data in accordance with destination UEs identified based on the tags, and accumulates the downlink data in the buffers. This eliminates the need for individually identifying the destinations of the downlink data when selecting the downlink data for the RRUs corresponding to the DM and when discarding the downlink data for other RRUs, thereby making it possible to shorten the processing time required for selection and discarding.

Second Embodiment

Figure 7:
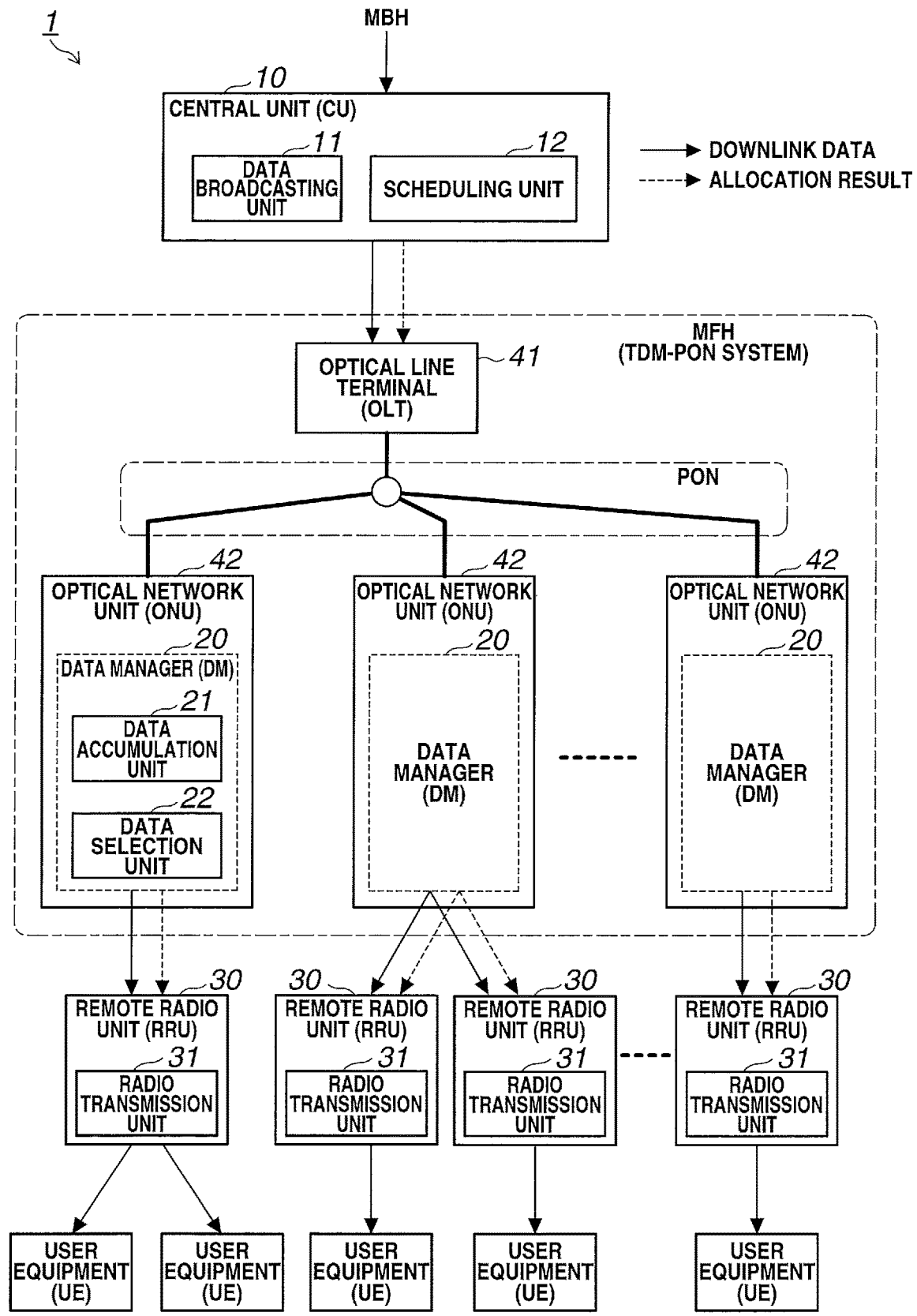
FIG. 7 is a block diagram showing the configuration of a radio network system according to the second embodiment.

A radio network system 1 according to the second embodiment of the present invention will be described next with reference to FIG. 7.

This embodiment will describe an example of a system configuration in which a DM formed from a circuit unit is implemented in each ONU (Optical Network Unit) constituting MFH formed from a TDM-PON system.

The MFH is formed from a general TDM-PON system, and includes one OLT (Optical Line Terminal) 41 connected to a CU and a plurality of ONUs (Optical Network Units) 42 connected to the OLT via a PON section formed from optical fibers and an optical splitter.

The OLT has a function of broadcasting downlink data output from the CU to the respective ONUs via the PON section.

In this embodiment, each ONU accommodates one or a plurality of RRUs under itself, and has a function of causing the same DM as that according to the first embodiment to select the downlink data corresponding to the RRUs under itself from the downlink data transferred from the OLT via the PON section and transfer the selected downlink data.

The DM of each ONU is provided with a data accumulation unit 21 and a data selection unit 22 as main functional units.

The data accumulation unit 21 is formed from a data buffer as a whole, and has a function of temporarily accumulating the downlink data broadcast from the CU.

The data selection unit 22 has a function of selecting, based on an allocation result obtained by scheduling in the CU, from the downlink data accumulated in the data accumulation unit 21, the downlink data allocated to the radio resources of the RRUs corresponding to the DM among the RRUs, that is, the corresponding RRUs located under the DM, and transferring the selected downlink data to the corresponding RRUs, and a function of discarding, from the data accumulation unit 21, the downlink data allocated to the radio resources of the RRUs other than the corresponding ones, that is, the RRUs located under the DMs other than this DM.

Figure 2:
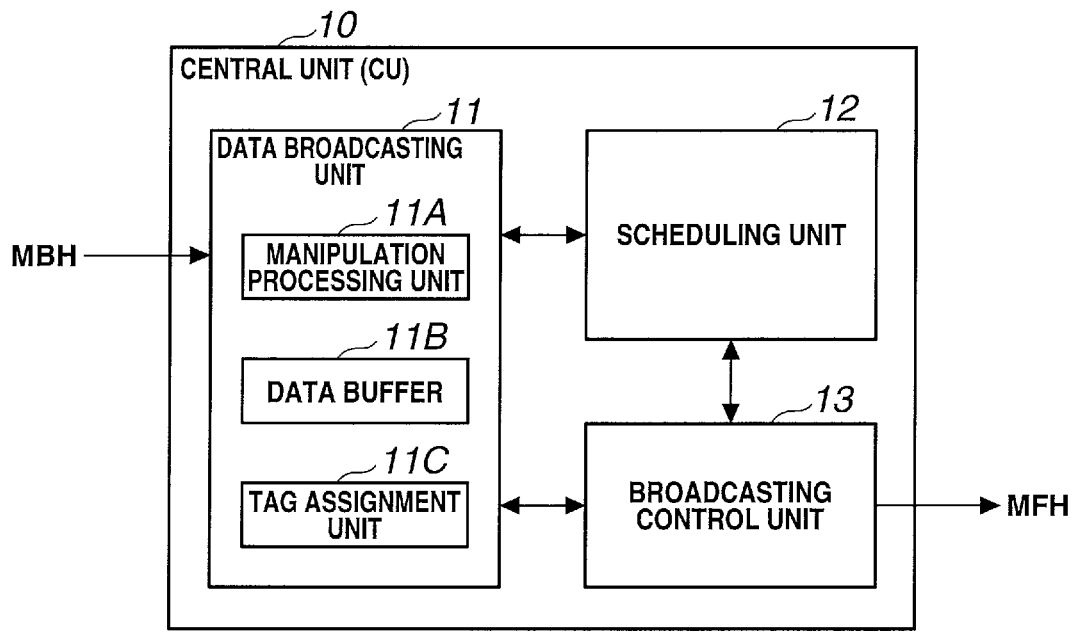
FIG. 2 is a block diagram showing the detailed arrangement of a CU according to the first embodiment.
Figure 3:
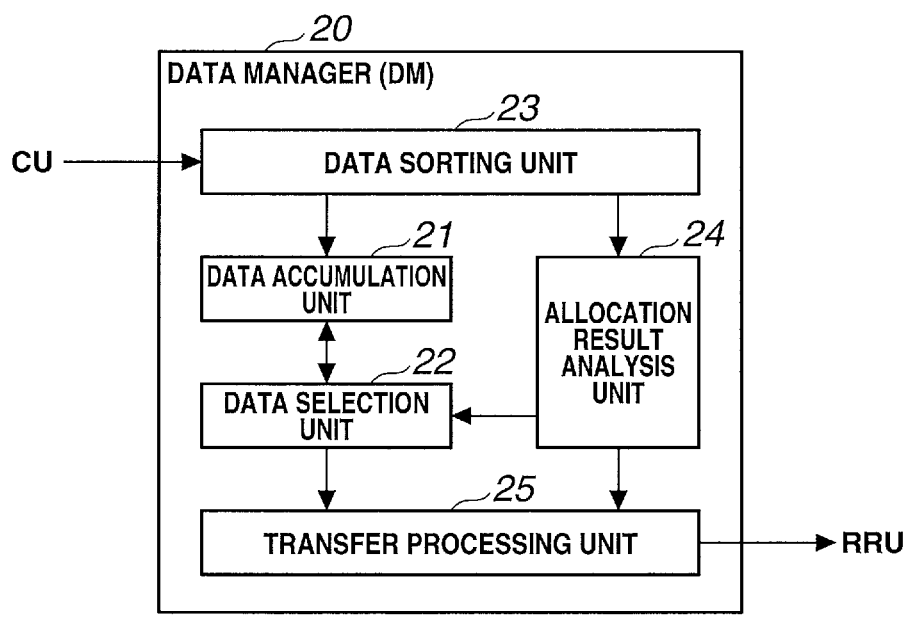
FIG. 3 is a block diagram showing the detailed arrangement of a DM according to the first embodiment.
Figure 4:
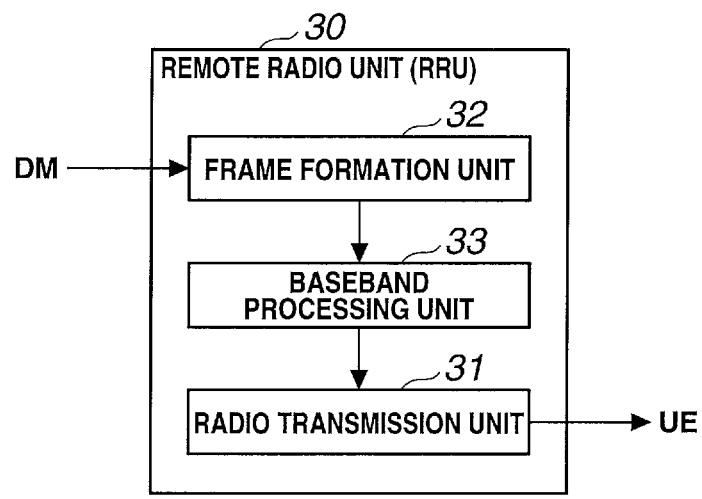
FIG. 4 is a block diagram showing the detailed arrangement of an RRU according to the first embodiment.

Examples of the arrangements of the CU, DM, and RRU are the same as those shown in FIGS. 2, 3, and 4 described in the first embodiment and a detailed description thereof will be omitted.

[Operation of Second Embodiment]

The operation of the radio network system 1 according to this embodiment will be described next with reference to FIGS. 5 and 8.

For the sake of easy understanding, a case in which ONUi (i represents the identification number of each ONU), RRUj (j represents the identification number of each RRU), and UEk (k represents the identification number of each UE) are connected in 1:1:1 correspondence will be exemplified below. However, if the plurality of RRUs are connected to one ONU or if the plurality of UEs are connected to one RRU, as shown in FIG. 7, this embodiment can be applied in the same manner (to be described below).

Figure 8:
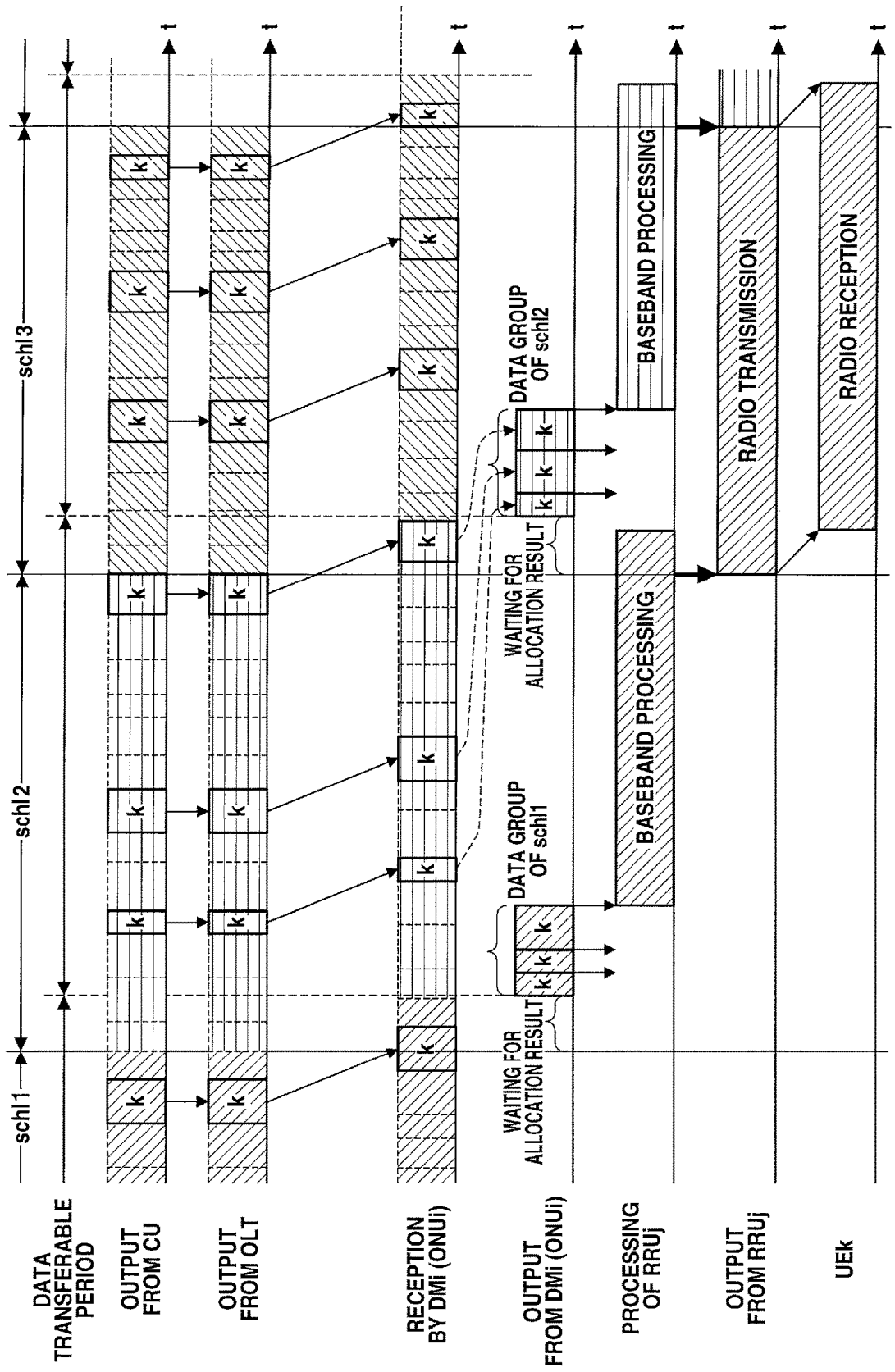
FIG. 8 is a timing chart showing an example of a data transfer operation according to the second embodiment.

In this embodiment, as shown in FIGS. 5 and 8, for every predetermined cycle sch1, the CU sequentially outputs, to the OLT, the downlink data received by the CU from the MBH without waiting for completion of radio resource allocation to the downlink data in the CU, and the OLT broadcasts the downlink data to all the ONUs via the PON section regardless of the destinations of the downlink data. Furthermore, for example, the DM of ONUi temporarily accumulates the downlink data in the buffer. After completion of radio resource allocation, the DM selects, based on the allocation result, only the downlink data to undergo radio transmission in RRUj under the ONUi from the buffer of ONUi and outputs the selected downlink data, performs baseband processing after generating a radio frame in RRUj using the downlink data, and performs radio transmission to UEk under RRUj.

[Operation of Central Unit]

The CU is basically the same as the conventional CU but is different from the conventional CU in that the CU sequentially transfers the downlink data to the OLT upon reception from the MBH without forming radio frames, the CU notifies the OLT of a radio resource allocation result by scheduling, and the CU estimates an amount of untransmitted data destined for each UE by scheduling. As an allocation result notification method, for example, the allocation result may be sent via a dedicated line or may be time-multiplexed in the downlink data.

A scheduling unit 12 needs to allocate a radio resource by confirming the presence/absence of untransmitted data destined for each UE including data transferred from the CU to the OLT. Thus, the scheduling unit 12 estimates, for each UE, an untransmitted data amount of the downlink data destined for the UE.

When $D_{untrans}[k]$ represents an amount of downlink data destined for the UE, which have not been transferred from the CU to the OLT and thus remain in the buffer of the CU, $D_{trans}[k]$ represents an amount of downlink data destined for UEk, which have been transferred from the CU to the OLT, and $D_{alloc}[k]$ represents an amount of downlink data destined for UEk, which have been allocated in the allocation result obtained by immediately preceding scheduling, an estimated value $D_{mon}[k]$ of the untransmitted data amount of the downlink data destined for UEk is obtained by:

$$D_{mon}[k]=D_{untrans}[k]+D_{trans}[k]-D_{alloc}[k] \qquad (1)$$

Note that the CU may copy the data transferred to the OLT and hold them, and then retransfer the data to the OLT upon receiving a retransfer instruction. At this time, in equation (1), $D_{untrans}$ may include the copy data destined for UEk, which have been confirmed to be retransferred.

[Operation of OLT]

The OLT classifies the downlink data transferred from the CU in accordance with the destination UEs, temporarily accumulates them in the buffers, and assigns, to each of the downlink data sequentially read out from the buffers, a broadcast LLID for setting all the ONU as destinations, thereby broadcasting the downlink data to all the ONUs. Furthermore, the allocation result of radio resource allocation sent from the CU is time-multiplexed in the downlink data and sent to all the ONUs. As an allocation result notification method, for example, the allocation result may be sent via a dedicated line or may be time-multiplexed in the downlink data.

At the time of broadcasting the downlink data, to prevent buffer overflow of each UE-specific buffer in the data accumulation unit 21 of the DM provided in each ONU, the OLT calculates the estimated value of the amount of untransmitted data destined for each UE, which are accumulated in each UE-specific buffer, and determines, based on the result of comparison between the estimated value and a predetermined remote radio unit threshold $D_{th}$, whether the downlink data can be broadcast. If the estimated value exceeds $D_{th}$, broadcasting of the downlink data destined for the UE to the ONUs is stopped, and the downlink data are accumulated in the buffer of the OLT until the estimated value becomes equal to or smaller than $D_{th}$.

When $D_{trans\_olt}[k]$ represents the total amount of the downlink data destined for UEk, which have already been broadcast from the OLT to the ONUs, and $D_{alloc}[k]$ represents the total amount of the downlink data destined for UEk, to which the radio resource has been allocated, an estimated value $D_{mon\_olt}[k]$ of the untransmitted data amount of the downlink data destined for UEk accumulated in the UE-specific buffer of the ONU is given by:

$$D_{mon\_olt}[k]=D_{trans\_olt}[k]-D_{alloc}[k] \qquad (2)$$

Note that the buffer threshold $D_{th}$ of the UE-specific buffer is set to a value smaller than a maximum accumulable data amount $D_{max\_buf}$ which can be accumulated in one UE-specific buffer of the RRU. For example, $D_{max\_buf}$ indicates a maximum transmittable data amount which can be transmitted from the RRU to one UE during a period of one cycle of scheduling in the CU.

[Operation of DM]

The DM of each ONU executes corresponding processing upon receiving each of the downlink data sequentially broadcast from the OLT or the radio resource allocation result sent from the OLT.

Figure 9:
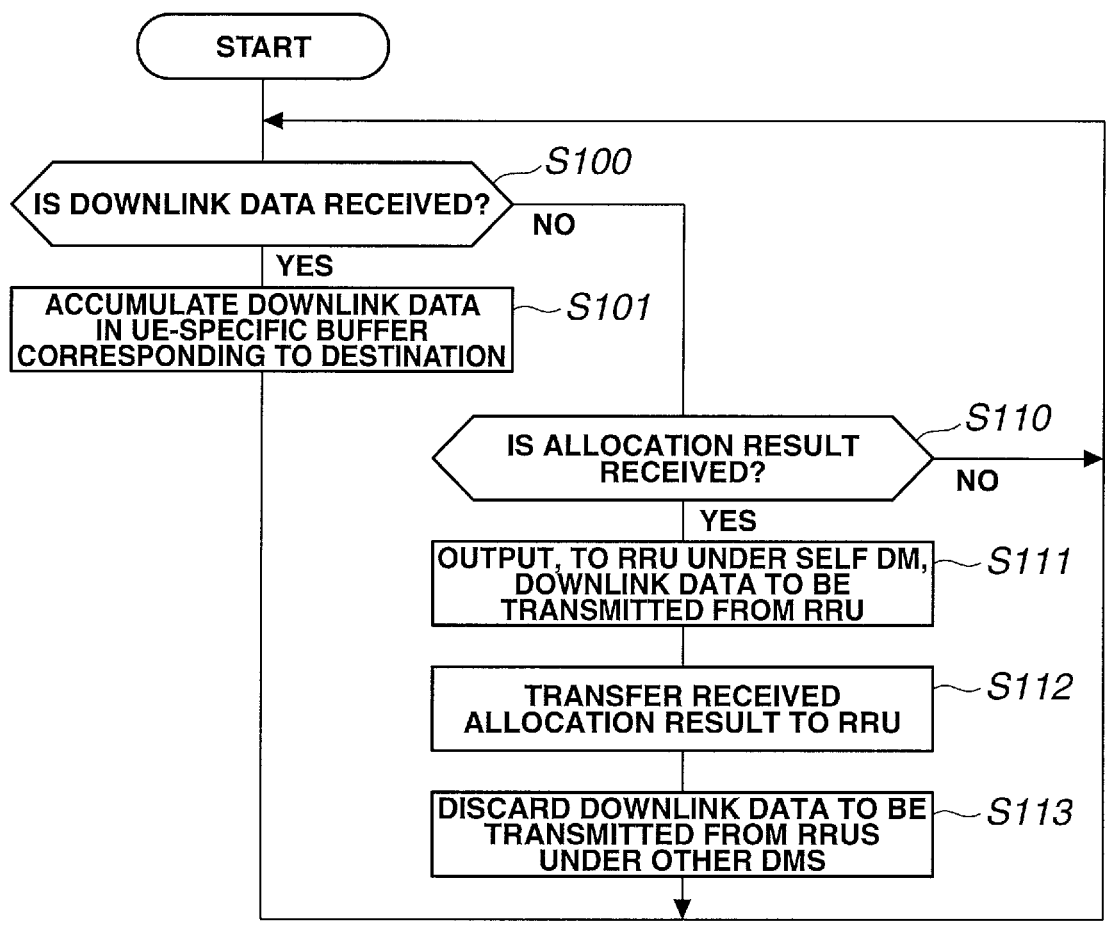
FIG. 9 is a flowchart illustrating reception standby processing by a DM according to the second embodiment.

Referring to FIG. 9, the DM intermittently executes a reception standby loop (NO in step S100 and NO in step S110). In the reception standby loop, if each of the downlink data sequentially broadcast from the OLT is received (YES in step S100), the data accumulation unit 21 of the DM accumulates, based on the destination of the downlink data, the downlink data in the UE-specific buffer corresponding to the destination (step S101), and the process returns to the reception standby loop.

On the other hand, in the reception standby loop, if the allocation result is received from the OLT (YES in step S110), the data selection unit 22 of the DM notifies the RRU under the DM of the received allocation result (step S111), and selects, from the corresponding UE-specific buffer, the downlink data to be transmitted from the RRU under the DM, whose amount is determined based on the allocation result, and outputs the selected downlink data to the RRU (step S112). Furthermore, the data selection unit 22 discards, from the corresponding UE-specific buffers, the downlink data to be transmitted from the RRUs under other DMs, whose amount is determined based on the allocation result (step S113), and the process returns to the reception standby loop.

[Operation of RRU]

Each RRU generates a radio frame from the downlink data and radio resource allocation result transferred from the ONU, performs baseband processing, and performs radio transmission to the corresponding UE using the radio resource according to the allocation result. Note that this embodiment has exemplified a case in which the RRU executes radio frame generation processing. The present invention, however, is not limited to this, and the DM may execute the radio frame generation processing.

Effect of Second Embodiment

As described above, in this embodiment, the MFH is formed from the TDM-PON system including one OLT connected to the CU and the plurality of ONUs accommodated in the OLT via optical fibers, and the DM is implemented in each ONU.

Similarly to the first embodiment, this arrangement prevents the transfer start timing of the downlink data via the MFH from being limited to the timing after completion of radio resource allocation in the CU, unlike the conventional technique. Thus, downlink data transfer starts even during scheduling for radio resource allocation in the CU, and each downlink data is transferred from the CU to the destination UE simultaneously with scheduling. Therefore, a period that can be used for downlink data transfer via the MFH is significantly extended, and thus the effective bandwidth of the MFH is extended, thereby making it possible to extremely efficiently transfer the downlink data from the CU to each RRU.

According to this embodiment, after all the downlink data are broadcast from the CU to all the DMs regardless of the destinations of the data, radio resource allocation is completed. Thus, at the time of completion of radio resource allocation, the downlink data are already accumulated in the DMs. Therefore, upon completion of radio resource allocation, each RRU can start baseband processing, thereby largely reducing the time required from reception of the downlink data from the MBH to transmission of radio frames to the UEs.

In this embodiment, the scheduling unit 12 of the CU may estimate, for each UE, the untransmitted data amount of the downlink data destined for the UE by subtracting the allocated data amount of the downlink data destined for the UE allocated in the immediately preceding allocation result from the sum of the remaining data amount of the downlink data destined for the UE remaining in the data broadcasting unit 11 and the broadcast data amount of the downlink data destined for the UE broadcast to the DM, and execute new scheduling based on the obtained estimated value of the untransmitted data amount.

With this arrangement, even if the CU has broadcast untransmitted data to the DMs and the CU holds no untransmitted data, the CU can grasp, for each UE, the amount of the untransmitted data by numerical calculation, and appropriately execute new scheduling.

In this embodiment, when broadcasting, to the RRUs via the ONUs, the downlink data transferred from the CU, the OLT may calculate, for each UE, the estimated remaining amount of the downlink data destined for the UE remaining in the corresponding RRU by subtracting the allocated data amount of the downlink data destined for the UE allocated in the allocation result obtained by immediately preceding scheduling from the broadcast data amount of the downlink data destined for the UE broadcast from the OLT to the RRUs, and determine, based on the result of comparison between the estimated remaining amount and the remote radio unit threshold of the UE-specific buffer provided in the RRU, whether the downlink data destined for the UE can be broadcast to the RRUs. At this time, a value smaller than the maximum accumulable data amount that can be accumulated in one UE-specific buffer provided in the RRU may be used as the remote radio unit threshold, and a maximum transmittable data amount that can be transmitted from the RRU during a period of one cycle of scheduling may be used as the maximum accumulable data amount.

This allows the OLT to grasp, for each UE, the amount of the untransmitted data held in each DM by numerical calculation.

Furthermore, when the OLT controls a transfer data amount for each UE in addition to the buffer capacity of each DM, it is possible to prevent buffer overflow in the DM.

Third Embodiment

A radio network system 1 according to the third embodiment of the present invention will be described next.

This embodiment is basically the same as the second embodiment but is different from the second embodiment in that a CU notifies each ONU of radio channel information via an OLT and, at the time of receiving downlink data, a DM of each ONU specifies, based on the radio channel information, UEs for which radio transmission is to be performed from each RRU under the DM, selects only the downlink data destined for the UEs, and accumulates the selected downlink data in buffers. A case in which this embodiment is applied to the second embodiment will be exemplified. This embodiment is also applicable to the fourth embodiment (to be described later) in the same manner (to be described below).

That is, in this embodiment, a scheduling unit 12 of the CU has a function of generating, for each RRU, based on wideband CQIs (Channel Quality Indicators) periodically sent from the respective UEs, radio channel information (a transmission destination radio terminal candidate list) indicating candidates of UEs to which radio transmission is to be performed from the RRU, and notifying the DM of each ONU of the information via the OLT.

A data accumulation unit 21 of each DM has a function of confirming, upon receiving each of the downlink data sequentially broadcast from the OLT, the destination UE of the downlink data with reference to the radio channel information sent in advance, and discarding, if the destination UE is not included in the radio channel information associated with each RRU under the DM, the downlink data before accumulating it in the buffer.

The radio channel information is information generated by the CU based on wideband CQIs (non-patent literature 5). The wideband CQI is a value used by each UE to periodically feed back a channel state for the receivable RRU to the CU. This is equivalent to processing in which each UE sends a notification of receivable RRU candidates and reception states from the candidates. The CU can create a UE candidate list for each RRU from the RRU candidates of each UE.

[Operation of Third Embodiment]

The operation of the radio network system 1 according to this embodiment will be described next.

In this embodiment, the scheduling unit 12 of the CU sequentially generates a radio terminal candidate list for each RRU from the wideband CQIs, and notifies the OLT of it as radio channel information. The notification method is the same as the radio resource allocation result notification method. The OLT notifies the DM of each ONU of the radio channel information by the same method as the radio resource allocation result notification method.

[Operation of DM]

The DM executes corresponding processing upon receiving each of the downlink data sequentially broadcast from the OLT or the radio resource allocation result sent from the OLT. Note that the radio channel information is sequentially sent from the CU, and saved in the DM.

Figure 10:
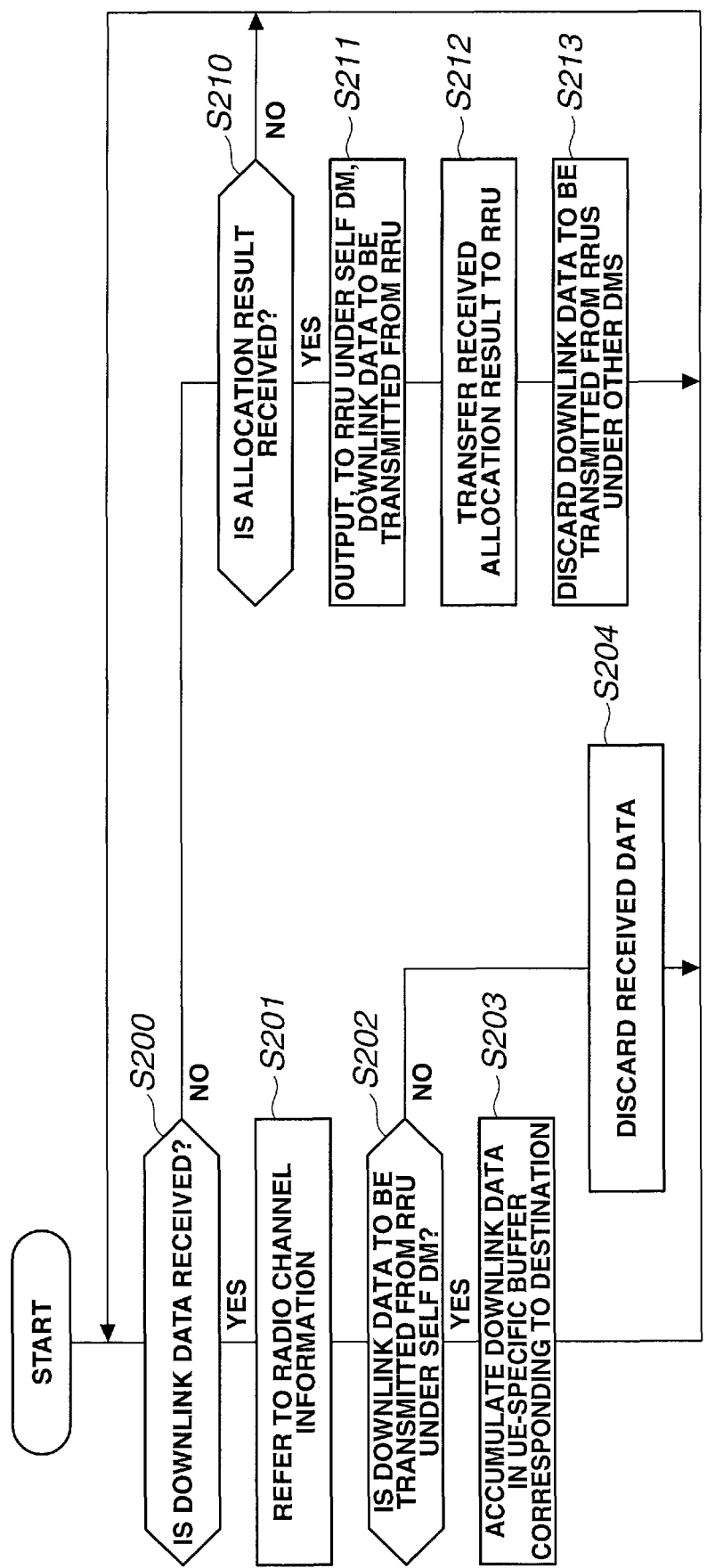
FIG. 10 is a flowchart illustrating reception standby processing by an ONU according to the third embodiment.

Referring to FIG. 10, the DM intermittently executes a reception standby loop (NO in step S200 and NO in step S210). In the reception standby loop, if each of the downlink data sequentially broadcast from the OLT is received (YES in step S200), the data accumulation unit 21 of the DM refers to the destination UE of the downlink data (step S201), and confirms whether the downlink data is data to be transmitted from the RRU under the DM (step S202).

If the destination UE of the downlink data is registered in the radio channel information of the RRU under the DM, and it is determined that the downlink data is data to be transmitted from the RRU under the DM (YES in step S202), the data accumulation unit 21 accumulates, based on the destination of the downlink data, the downlink data in a UE-specific buffer corresponding to the destination (step S203), and the process returns to the reception standby loop.

On the other hand, if the destination UE of the downlink data is not registered in the radio channel information of the RRU under the DM, and it is determined that the downlink data is not data to be transmitted from the RRU under the DM (NO in step S202), the data accumulation unit 21 discards the downlink data without accumulating it in the buffer (step S204), and the process returns to the reception standby loop.

On the other hand, in the reception standby loop, if the allocation result is received from the OLT (YES in step S210), a data selection unit 22 notifies the RRU under the DM of the received allocation result (step S211), and selects, from the corresponding UE-specific buffer, the downlink data to be transmitted from the RRU under the DM, whose amount is determined based on the allocation result, and outputs the selected data to the RRU (step S212). Furthermore, the data selection unit 22 discards, from the corresponding UE-specific buffers, the downlink data to be transmitted from the RRUs under other DMs, whose amount is determined based on the allocation result (step S213), and the process returns to the reception standby loop.

Effect of Third Embodiment

In this embodiment, the scheduling unit 12 of the CU generates, for each RRU, based on the wideband CQIs periodically sent from the respective UEs, radio channel information indicating candidates of UEs to which radio transmission is to be performed from the RRU, and notifies each DM of the information. Upon receiving each of the downlink data sequentially broadcast from the CU, the data accumulation unit 21 of each DM confirms the destination UE of the downlink data with reference to the radio channel information sent in advance, and discards, if the destination UE is not included in the radio channel information associated with each RRU under the DM, the downlink data before accumulating it in the buffer.

Therefore, since only the downlink data to be transmitted from each RRU under the DM is accumulated in the buffer of the DM, it is possible to suppress unnecessary accumulation of downlink data in the buffer, thereby reducing the buffer processing load of the DM and reducing the total buffer size of the DM.

Fourth Embodiment

Figure 11:
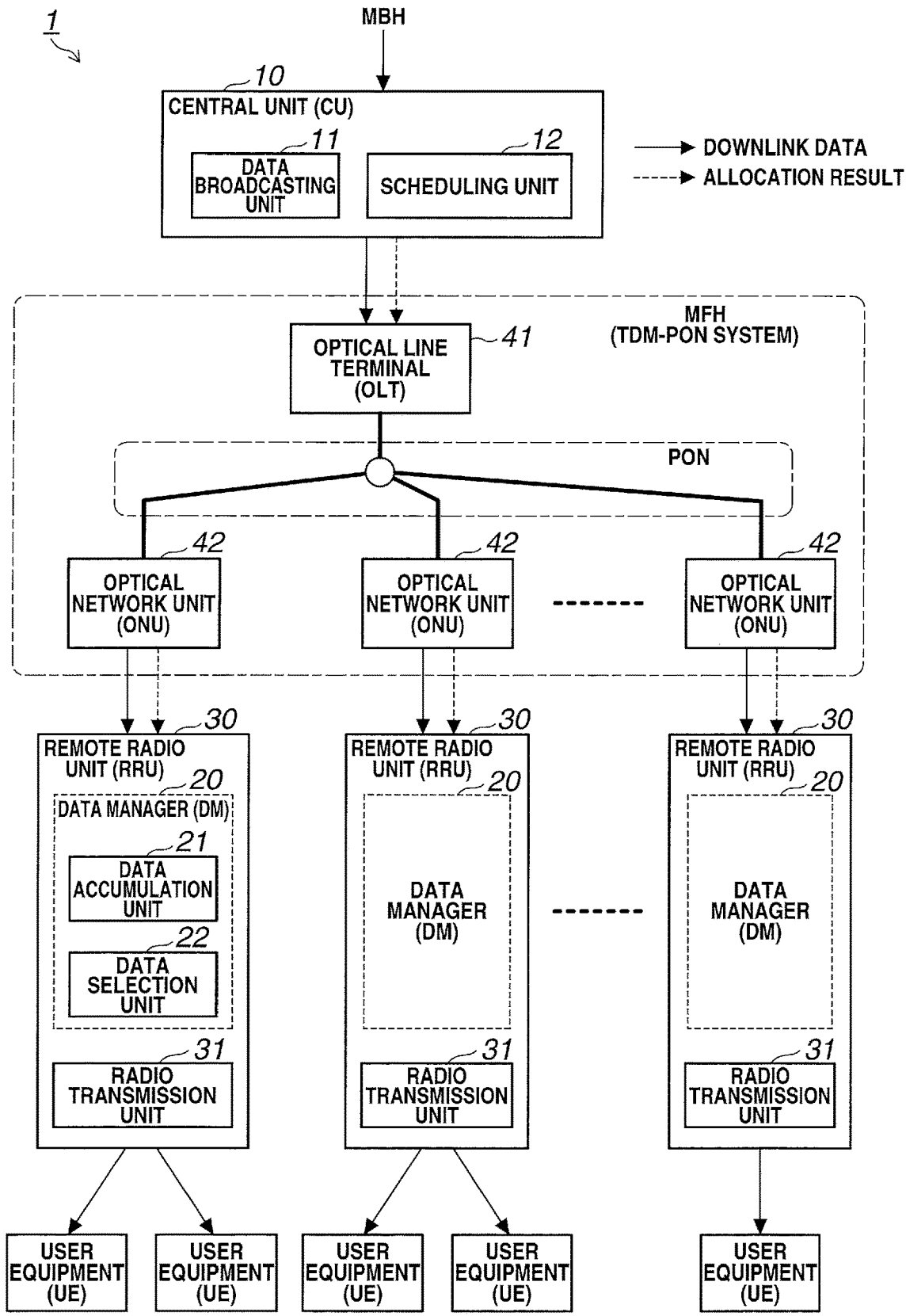
FIG. 11 is a block diagram showing the configuration of a radio network system according to the fourth embodiment.

A radio network system 1 according to the fourth embodiment of the present invention will be described next with reference to FIG. 11.

In this embodiment, an example of a system configuration in which a DM formed from a circuit unit is implemented in each RRU will be described.

In this embodiment, MFH is formed from a general TDM-PON system, and includes one OLT (Optical Line Terminal) 41 connected to a CU and a plurality of ONUs (Optical Network Units) 42 connected to the OLT via a PON section formed from optical fibers and an optical splitter. Note that the CU is the same as that according to the first embodiment and a detailed description thereof will be omitted.

In this embodiment, one or a plurality of RRUs are connected to each ONU, and each have a function of causing the same DM as that according to the first embodiment to select downlink data corresponding to the RRU from downlink data transferred from the corresponding ONU and perform radio transmission from a radio transmission unit 31 to one or a plurality of UEs under the RRU.

Each DM is provided with a data accumulation unit 21 and a data selection unit 22 as main functional units.

The data accumulation unit 21 is formed from a data buffer as a whole, and has a function of temporarily accumulating the downlink data transferred from the ONU in UE-specific buffers corresponding to destination UEs described in the tags of the downlink data.

The data selection unit 22 has a function of selecting, based on an allocation result obtained by scheduling in the CU, from the downlink data accumulated in the data accumulation unit 21, the downlink data from the UE-specific buffers of the destination UEs allocated to the radio resource of the self RRU, and a function of discarding the downlink data from the UE-specific buffers of the destination UEs allocated to the radio resources of the RRUs other than the self RRU.

The radio transmission unit 31 has a function of performing, based on the allocation result obtained by scheduling in the CU, radio transmission of the downlink data selected in the DM to the corresponding UEs using the designated radio resource.

[Detailed Arrangement of RRU]

An example of the detailed arrangement of each RRU will be described next with reference to FIG. 12.

The RRU is provided with, as main functional units, the data accumulation unit 21, the data selection unit 22, a data sorting unit 23, and an allocation result analysis unit 24 that constitute the DM, a frame formation unit 32, a baseband processing unit 33, and the radio transmission unit 31.

The data accumulation unit 21 is formed from a data buffer as a whole, and has a function of temporarily accumulating the downlink data broadcast from the CU in the UE-specific buffers corresponding to destination UEs described in the tags of the downlink data.

The data selection unit 22 has a function of selecting, based on an analysis result obtained by the allocation result analysis unit 24, from the downlink data accumulated in the data accumulation unit 21, the downlink data from the UE-specific buffers of the destination UEs allocated to the radio resource of the self RRU (corresponding RRU), and a function of discarding the downlink data from the UE-specific buffers of the destination UEs allocated to the radio resources of the RRUs other than the self RRU.

The data sorting unit 23 has a function of outputting, if the data received from the CU via the MFH is the downlink data, the data to the data accumulation unit 21, and outputting, if the received data is the allocation result, the data to the allocation result analysis unit 24.

The allocation result analysis unit 24 has a function of analyzing the allocation result from the data sorting unit 23 and extracting an analysis result including the destination UE and radio transmission data amount of each corresponding downlink data.

The frame formation unit 32 has a function of forming, based on the allocation result (or analysis result) output from the allocation result analysis unit 24, a radio frame storing the downlink data selected by the data selection unit 22 for each destination UE.

The baseband processing unit 33 has a function of generating baseband data of layer 1 by performing baseband processing for the radio frame output from the frame formation unit 32.

The radio transmission unit 31 has a function of performing radio transmission of the baseband data output from the baseband processing unit 33 to the corresponding UE using the designated radio resource.

[Operation of Fourth Embodiment]

The operation of the radio network system 1 according to this embodiment will be described next with reference to FIG. 5.

As shown in FIG. 5, the operation according to this embodiment is the same as that according to the first embodiment. The downlink data received by the CU from the MBH are broadcast (MFH-transferred) from a data broadcasting unit 11 of the CU to all the DMs (RRUs) regardless of the destinations of the data without waiting for completion of radio resource allocation to the downlink data by a scheduling unit 12.

Each DM temporarily accumulates, based on the destination UEs, the downlink data in UE-specific buffers provided in the data accumulation unit 21. Based on the allocation result sent from the CU upon completion of radio resource allocation, the data selection unit 22 of the DM selects, from the corresponding UE-specific buffers, only the downlink data to undergo radio transmission from the self RRU, and transfers the selected downlink data to the radio transmission unit 31. Furthermore, the data selection unit 22 discards, from the corresponding UE-specific buffers, the downlink data to undergo radio transmission from other RRUs.

After that, radio frames storing the downlink data selected by the data selection unit 22 undergo baseband processing, and undergo radio transmission from the radio transmission unit 31 to the corresponding UEs under the RRU.

Note that in this embodiment, as the allocation result notification method, for example, the allocation result may be sent via a dedicated line or may be time-multiplexed in the downlink data. Furthermore, the downlink data to undergo radio transmission from other RRUs may be updated in terms of the readout start position of the buffer, instead of being discarded.

Effect of Fourth Embodiment

As described above, in this embodiment, the MFH is formed from the TDM-PON system including one OLT connected to the CU and the plurality of ONUs accommodated in the OLT via the optical fibers, and the DM is implemented in each RRU.

Similarly to the first embodiment, this arrangement prevents the transfer start timing of the downlink data via the MFH from being limited to the timing after completion of radio resource allocation in the CU, unlike the conventional technique. Thus, downlink data transfer starts even during scheduling for radio resource allocation in the CU, and each downlink data is transferred from the CU to the destination UE simultaneously with scheduling. Therefore, a period that can be used for downlink data transfer via the MFH is significantly extended, and thus the effective bandwidth of the MFH is extended, thereby making it possible to extremely efficiently transfer the downlink data from the CU to each DM (RRU).

According to this embodiment, after all the downlink data are broadcast from the CU to all the DMs regardless of the destinations of the data, radio resource allocation is completed. Thus, at the time of completion of radio resource allocation, the downlink data are already accumulated in the DMs. Therefore, upon completion of radio resource allocation, each RRU can start baseband processing, thereby largely reducing the time required from reception of the downlink data from the MBH to transmission of radio frames to the UEs.

Fifth Embodiment

A radio network system 1 according to the fifth embodiment of the present invention will be described next with reference to FIG. 13.

This embodiment is basically the same as the fourth embodiment but is different from the fourth embodiment in that a CU holds, in a mirror buffer, downlink data already transferred to DMs, downlink data to be transferred to the DMs are limited based on the data amount of the downlink data held in the mirror buffer, and a scheduling unit 12 operates differently.

Figure 13:
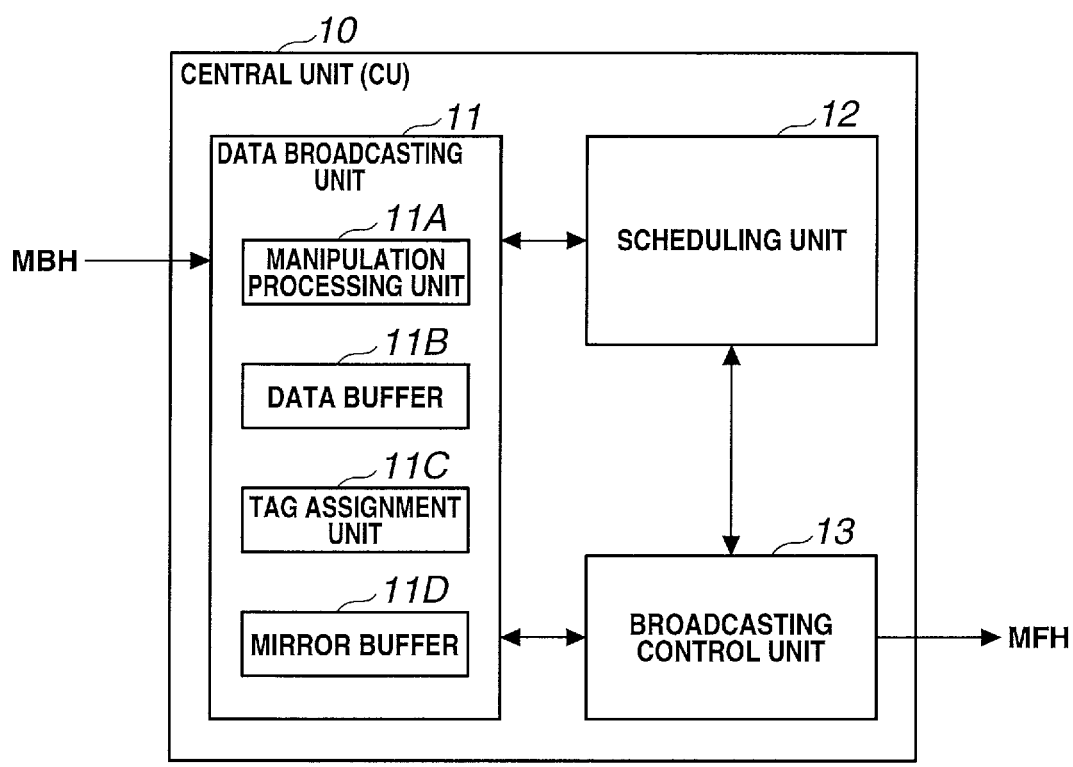
FIG. 13 is a block diagram showing the detailed arrangement of a CU according to the fifth embodiment.

As shown in FIG. 13, the CU according to this embodiment is different from the arrangement shown in FIG. 2 described above in that a mirror buffer 11D is added to a data broadcasting unit 11.

The mirror buffer 11D has a function of holding the same downlink data as those which have not been broadcast to the DMs (RRUs) via MFH, among downlink data accumulated in a data buffer 11B.

A broadcasting control unit 13 has a function of temporarily limiting downlink data to be broadcast to the DMs based on the data amount of downlink data which have not been broadcast and are held in the mirror buffer 11D, and a function of holding, in the data buffer 11B, downlink data which are not transferred during the limitation period.

[Operation of Fifth Embodiment]

The operation of the radio network system 1 according to this embodiment will be described next.

Upon receiving downlink data from MBH during scheduling, the data broadcasting unit 11 performs manipulation processing in a manipulation processing unit 11A, and classifies the data in accordance with destination UEs to temporarily accumulate them in the data buffer 11B. After extracting, from the data buffer 11B, the downlink data destined for UEs, for which the data broadcasting unit 11 have been notified of transfer permission from the broadcasting control unit 13, the data broadcasting unit 11 classifies copies of the downlink data in accordance with destination UEs and accumulates them in the mirror buffer 11D while assigning tags to the downlink data by the tag assignment unit 11C and outputting them to the broadcasting control unit 13.

Upon completion of scheduling, while an obtained allocation result is transferred, the data broadcasting unit 11 discards, based on the transfer result sent from the scheduling unit 12, the downlink data which have been confirmed to undergo radio transmission by scheduling among the downlink data accumulated in the mirror buffer 11D. With this processing, only the downlink data which have not been broadcast are held in the mirror buffer 11D.

On the other hand, the broadcasting control unit 13 permits broadcasting of the allocation result in preference to the downlink data, and prohibits broadcasting of all the downlink data from the data broadcasting unit 11 during broadcasting of the allocation result. After that, the broadcasting control unit 13 permits transfer of the downlink data upon completion of transfer of the allocation result. This embodiment is different from the fourth embodiment in that transfer permission is issued for at least each destination UE. More specifically, the broadcasting control unit 13 monitors the data amount of the downlink data accumulated in the mirror buffer 11D for at least each destination UE. While the data amount of an arbitrary destination UE is equal to or larger than a preset central unit threshold, only transfer of the downlink data to the corresponding destination UE is prohibited. Then, if the data amount becomes smaller than the central unit threshold, transfer of the downlink data to the corresponding destination UE is permitted.

The scheduling unit 12 is basically the same as that according to the fourth embodiment. Since, however, the accumulation amount of destination UE-specific downlink data accumulated in the data buffer 11B and the mirror buffer 11D can be used as a destination UE-specific untransmitted data amount, it is unnecessary to estimate the untransmitted data amount, as described above.

Effect of Fifth Embodiment

As described above, in this embodiment, in the CU, the data broadcasting unit 11 holds, in the UE-specific mirror buffers, the downlink data broadcast to the DMs while deleting, from the UE-specific mirror buffers, the downlink data which have been allocated to radio resources by scheduling. Consequently, downlink data identical to the downlink data destined for each UE accumulated in each DM are held in the UE-specific mirror buffer, and broadcasting of the downlink data destined for the UE to the UE for which the accumulation amount of the downlink data held in the UE-specific mirror buffer is equal to or larger than the predetermined central unit threshold is limited.

With this arrangement, the downlink data which have not been broadcast from the CU to the DMs are held in the UE-specific mirror buffers, and thus it is possible to grasp the untransmitted data amount of each UE based on the accumulation amount of each UE-specific mirror buffer. Therefore, as compared with a case in which untransmitted data are estimated, it is possible to more correctly grasp the untransmitted data amount, and suppress unnecessary broadcasting of the downlink data.

Furthermore, if the UE moves to be under another CU, it is necessary to move untransmitted downlink data destined for the corresponding UE from the CU before movement to the CU after movement. According to this embodiment, however, since the CU holds all untransmitted downlink data in its buffer, it is unnecessary to return, to the CU, the untransmitted downlink data destined for the corresponding UE, which have been broadcast from the DM, and it is only necessary to cause the DM to discard the untransmitted downlink data destined for the corresponding UE accumulated in the DM. Therefore, even if the UE moves to be under another CU, it is possible to move the downlink data to the other CU without consuming the bandwidth of the MFH.

Sixth Embodiment

A radio network system 1 according to the sixth embodiment of the present invention will be described next with reference to FIG. 14.

An arrangement according to this embodiment is basically the same as that according to the fourth embodiment but is mainly different in that a CU retransmits downlink data before confirmation of radio transmission and each DM includes a buffer having a dual-buffer architecture with a standby buffer and an operating buffer.

Figure 14:
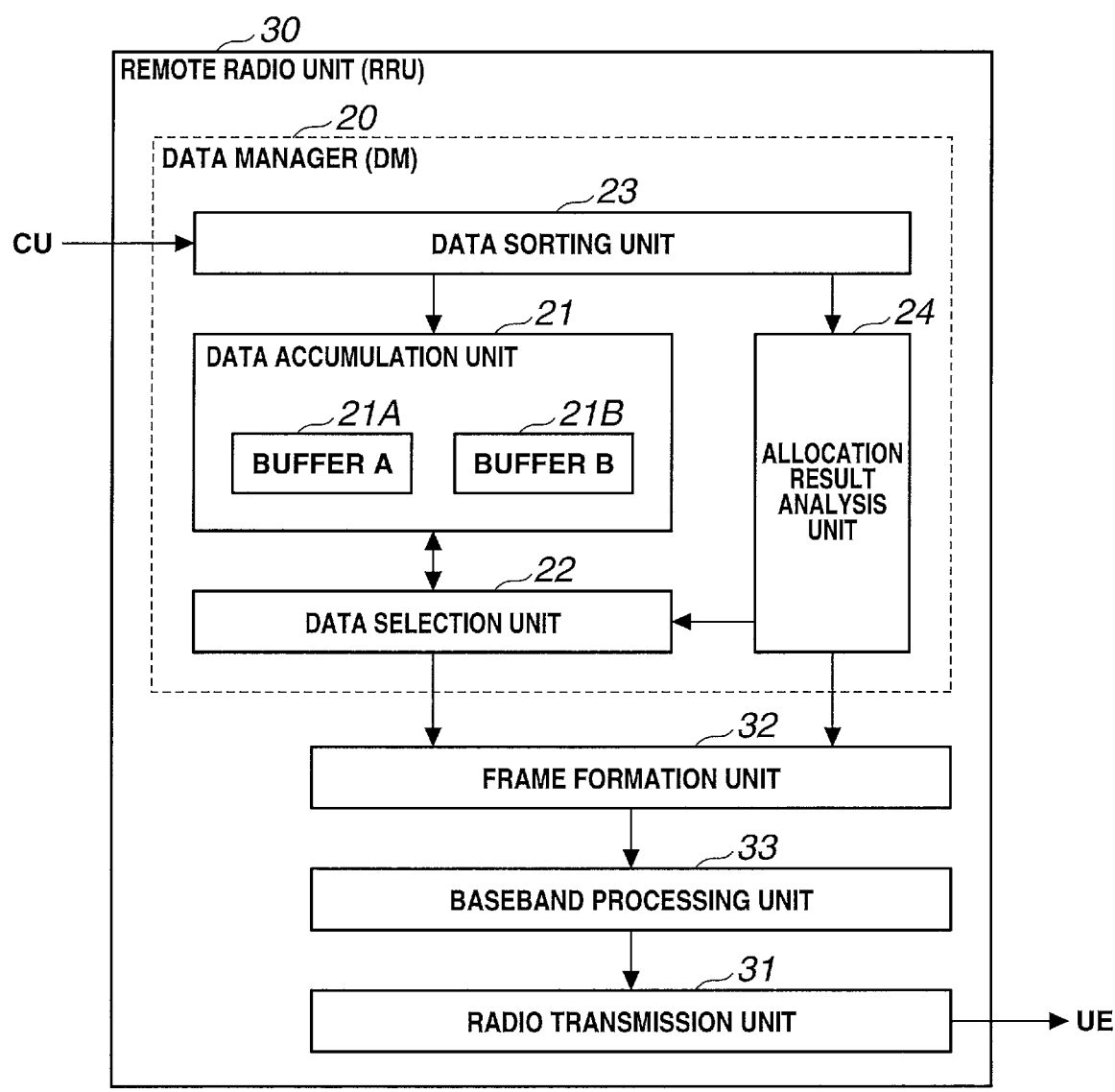
FIG. 14 is a block diagram showing the detailed arrangement of a DM according to the sixth embodiment.

As shown in FIG. 14, as compared with the arrangement shown in FIG. 2 described above, the DM according to this embodiment includes a data accumulation unit 21 having a dual-buffer architecture with a buffer A 21A and a buffer B 21B. Every time an allocation result is received, one of buffers A and B is switched from the operating buffer to the standby buffer, from which downlink data accumulated so far are read out, and the other buffer is switched from the standby buffer to the operating buffer, in which new downlink data received after switching are sequentially accumulated.

[Operation of Sixth Embodiment]

The operation of the radio network system 1 according to this embodiment will be described next with reference to FIG. 15.

This embodiment has a feature that every time the CU performs scheduling, downlink data as radio transmission candidates are broadcast to all DMs to reduce the capacities of the buffers of the DMs. That is, even if the downlink data has been broadcast to the DMs, if radio transmission is confirmed for the downlink data, the CU retransmits the downlink data.

This eliminates the need for each DM to hold the downlink data in the buffer across a plurality of scheduling cycles, and thus it is only necessary to include a buffer of a capacity to hold downlink data which can be broadcast from the CU within one scheduling cycle.

To achieve this, the CU according to this embodiment temporarily holds, in a data buffer 11B, the downlink data received from MBH, and then sequentially broadcast the data to the DMs from the beginning of the data buffer 11B. Upon completion of scheduling, while an obtained allocation result is broadcast to the DMs, the data confirmed to undergo radio transmission are erased from the data buffer 11B based on the allocation result.

[Downlink Data Broadcasting Operation in CU]

Figure 15:
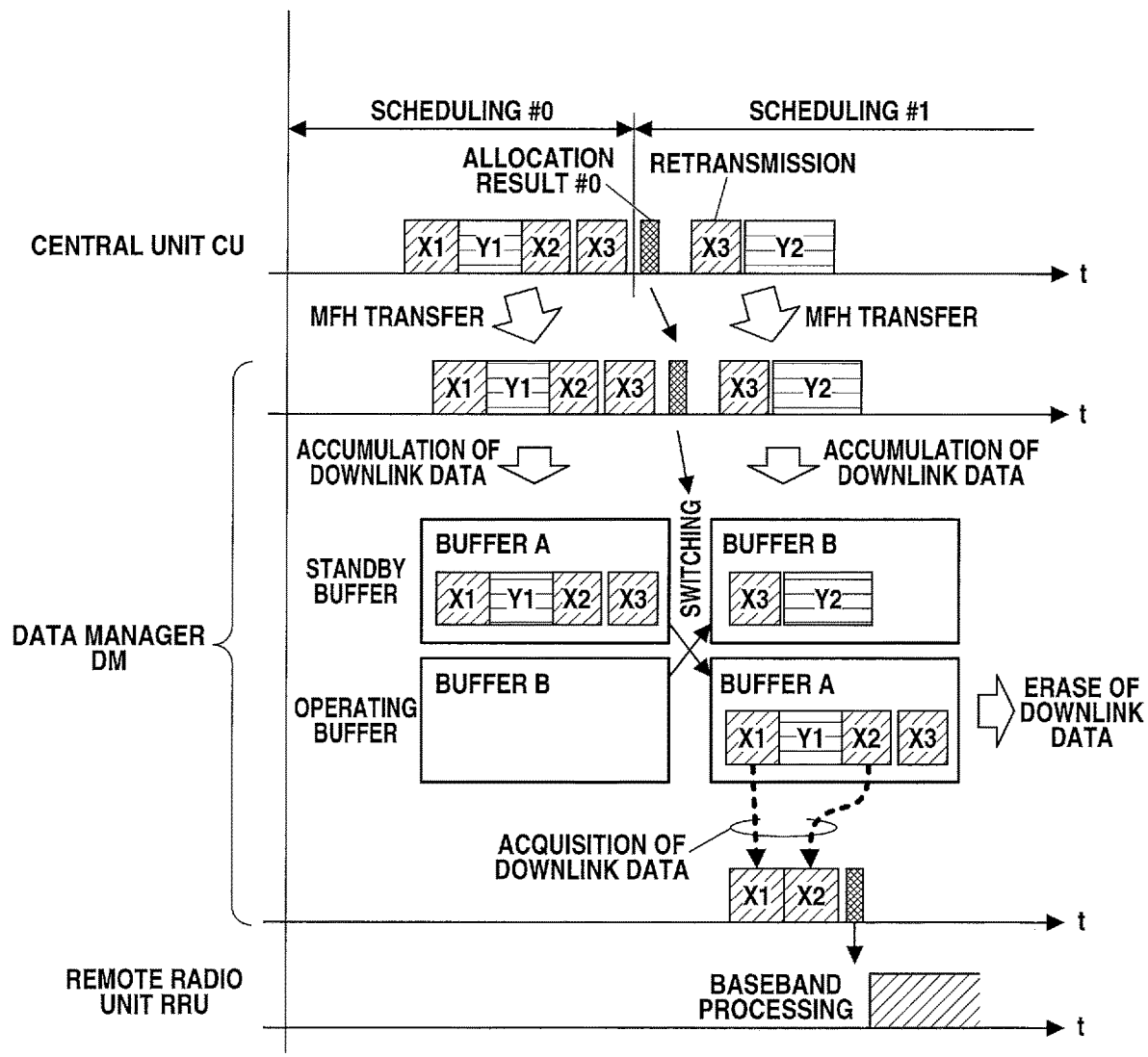
FIG. 15 is a timing chart for explaining an outline of a data transfer operation according to the sixth embodiment.

As shown in FIG. 15, during a period of scheduling #0, upon receiving downlink data from the MBH, a data broadcasting unit 11 of the CU performs manipulation processing in a manipulation processing unit 11A, and classifies the data in accordance with destination UEs to temporarily accumulate them in the data buffer 11B. Furthermore, the data broadcasting unit 11 sequentially generates a copy from the first downlink data accumulated in the data buffer 11B, assigns a tag to the copied downlink data by the tag assignment unit 11C, and outputs the data to a broadcasting control unit 13.

The broadcasting control unit 13 encapsulates, by Ethernet, the downlink data output from the data broadcasting unit 11, and broadcasts it to all the DMs. At this time, the CU performs scheduling in a scheduling unit 12 simultaneously with the broadcasting processing. In scheduling, the presence/absence of the downlink data accumulated in the data buffer 11B is identified for each destination UE.

If scheduling in the scheduling unit 12 is completed and the period of scheduling #0 ends, the data broadcasting unit 11 causes the tag assignment unit 11C to assign a tag to an allocation result output from the scheduling unit 12, and outputs the allocation result to the broadcasting control unit 13.

The broadcasting control unit 13 encapsulates, by Ethernet, the allocation result output from the data broadcasting unit 11, and broadcasts it to all the DMs while preferentially transferring the allocation result to the DMs by stopping transfer of the downlink data until broadcasting of the allocation result ends.

With this processing, while the allocation result is transferred, the CU broadcasts no downlink data. While the allocation result is broadcast, the data broadcasting unit 11 discards, from the data buffer 11B, the allocation result and the downlink data confirmed to undergo radio transmission.

[Downlink Data Reception Operation in DM]

As shown in FIG. 15, if the DM receives the downlink data from the CU during the period of scheduling #0, the data accumulation unit 21 is notified of all the received downlink data via a data sorting unit 23. Until the allocation result is received, the data accumulation unit 21 accumulates each downlink data in a UE-specific buffer corresponding to a destination UE described in the tag of the downlink data with respect to the standby buffer of buffers A and B. At this time, the downlink data is accumulated by removing the tag from it.

After that, if the allocation result is received from the CU, an allocation result analysis unit 24 is notified of the allocation result via the data sorting unit 23. In response to this, the data accumulation unit 21 switched between the standby buffer and operating buffer of buffers A and B.

The allocation result analysis unit 24 confirms a transmission source RRU based on the tag of the received allocation result, and confirms whether the allocation result is for the self RRU. If the allocation result is for the self RRU, the allocation result analysis unit 24 acquires, from the allocation result, at least a destination UE having the self RRU as a radio transmission source and a radio transmission data amount, and notifies a data selection unit 22 and a frame formation unit 32 of them.

The data selection unit 22 acquires the downlink data to undergo radio transmission from the operating buffer of buffers A and B of the data accumulation unit 21 based on the notification from the allocation result analysis unit 24, and notifies the frame formation unit 32 of the acquired downlink data together with their destination UEs.

The frame formation unit 32 forms a radio frame for each destination UE based on the downlink data from the data selection unit 22. The formed radio frame undergoes baseband processing in a baseband processing unit 33, and undergoes radio transmission from the radio transmission unit 31 to the corresponding UE. Note that upon completion of acquisition of the downlink data by the data selection unit 22, the data accumulation unit 21 clears the operating buffer (discards the data).

In the example of FIG. 15, during the period of scheduling #0, downlink data X1, X2, and X3 destined for UE # X and downlink data Y1 destined for UE # Y are transferred to a DM under which UE # X exists, and accumulated in buffer A as the standby buffer. Upon receiving allocation result #0 obtained during the period of scheduling #0, buffer A is switched to a new operating buffer and buffer B is switched to a new standby buffer. At this time, if no radio resource is allocated to downlink data X3 in allocation result #0 obtained during the period of scheduling #0, the DM acquires downlink data X1 and X2 from the operating buffer to start baseband processing for radio transmission, and discards remaining downlink data Y1 and X3. During a period of scheduling #1 after allocation result #0 is received, downlink data X3 for retransmission and new downlink data Y2 are accumulated in buffer B as the standby buffer.

In this embodiment, the data accumulation unit 21 of the DM discards all the remaining downlink data in the operating buffer after switching between the operating buffer and the standby buffer. However, as long as it is possible to grasp the start point and end point of write in buffer A or B and discriminate between the downlink data accumulated last time and the new downlink data accumulated this time, it is not always necessary to discard the remaining downlink data. The same applies to discarding from the buffer of the data broadcasting unit 11 of the CU.

Effect of Sixth Embodiment

As described above, in this embodiment, in the CU, the data broadcasting unit 11 accumulates the downlink data received from the MBH in the UE-specific buffers corresponding to the destination UEs of the downlink data, reads out the downlink data accumulated in the UE-specific buffers to broadcast them to the DMs until radio resource allocation by scheduling is completed, and notifies each DM of a new allocation result obtained upon completion of allocation while discarding, from the UE-specific buffers, the downlink data which have been allocated. In each DM, the data selection unit 22 selects, based on the allocation result sent from the CU, the downlink data allocated to the radio resource of the self RRU (corresponding RRU) from the downlink data accumulated in the data accumulation unit 21, and discards all the remaining unselected downlink data from the data accumulation unit 21.

With this arrangement, every time scheduling is performed, the CU broadcasts downlink data as radio transmission candidates to all the DMs (RRUs). Therefore, even if the downlink data has been broadcast to the DMs but has not been confirmed to undergo radio transmission, the CU retransmits the downlink data. Consequently, each DM need not hold the downlink data in the buffer across a plurality of scheduling cycles, and thus it is only necessary to include a buffer of a capacity to hold downlink data which can be broadcast from the CU within one scheduling cycle, thereby reducing the capacity of the buffer of the DM.

Furthermore, in this embodiment, the data accumulation unit 21 has a dual-buffer architecture with two buffers, that is, buffers A and B as buffers for accumulating downlink data, allocates one buffer to a standby buffer and the other buffer to an operating buffer until a notification of a new allocation result obtained by scheduling is sent from the CU to accumulate, in the standby buffer, the downlink data transferred from the CU, and then switches between one buffer and the other buffer every time a notification of a new allocation result is sent. When selecting the downlink data, the data selection unit 22 may select, based on the allocation result, the downlink data from one of the buffers, which is allocated to the operating buffer, and erase, upon completion of selection, all the downlink data accumulated in the buffer allocated to the operating buffer.

This makes it possible to avoid erroneous transmission of retransmission data in which each DM erroneously transfers, based on the allocation result, to the RRU, retransmission data as a radio transmission candidate in next scheduling from the CU, and the RRU transmits the data to the UE.

Seventh Embodiment

The operation of a radio network system 1 according to this embodiment will be described next with reference to FIG. 16.

This embodiment is basically the same as the fourth embodiment but is different in that a CU generates a header of a radio frame and transfers it to DMs and each DM forms a radio frame based on the header received from the CU.

Figure 16:
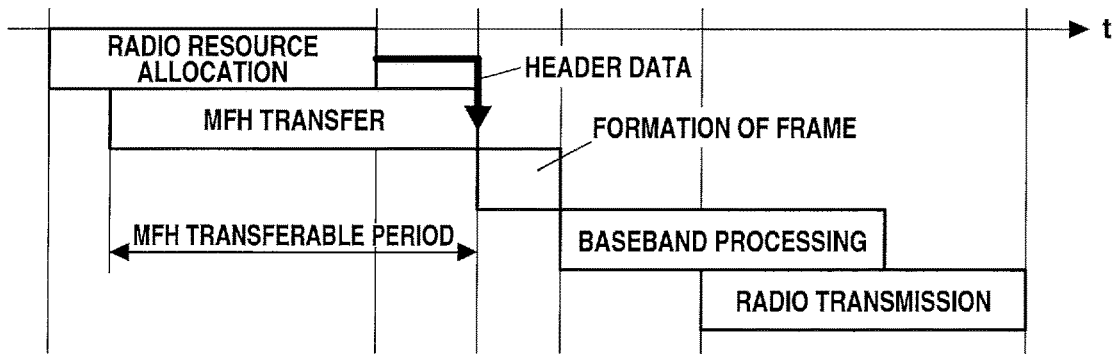
FIG. 16 is a timing chart for explaining an outline of a data transfer operation according to the seventh embodiment.

As shown in FIG. 16, the CU starts to broadcast downlink data to all the DMs (RRUs) before completion of scheduling, similarly to the fourth embodiment. Each DM classifies the transferred data in accordance with destination UEs and accumulates them in buffers.

Upon completion of scheduling, the CU generates a header of a radio frame for each UE based on an obtained allocation result, and broadcasts header data including the generated header, destination UE, and transmission source RRU to all the DMs (RRUs).

Each DM selects the header data whose transmission source is the self RRU from the received header data, and acquires corresponding downlink data from a data accumulation unit 21 based on the destination UE acquired from the header data and a data length described in the header. This forms a radio frame based on the downlink data and the header.

Figure 17:
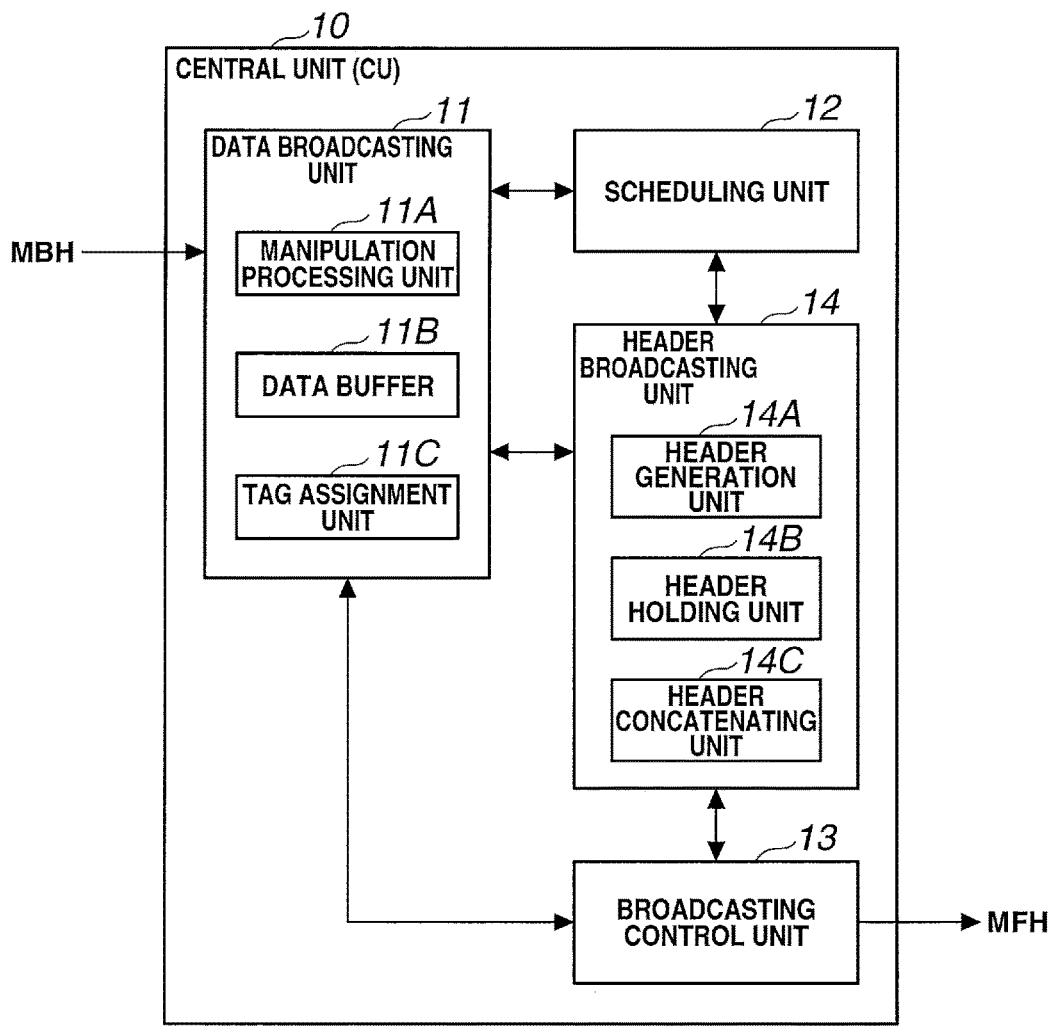
FIG. 17 is a block diagram showing the detailed arrangement of a CU according to the seventh embodiment.

As shown in FIG. 17, the CU according to this embodiment has an arrangement obtained by adding a header broadcasting unit 14 to the arrangement shown in FIG. 2 described above.

The header broadcasting unit 14 has a function of generating, for each UE, based on the allocation result obtained in the scheduling unit 12, a frame header for performing radio transmission of downlink data from the RRU to the corresponding UE by a radio frame, and broadcasting the frame header to the DMs.

The header broadcasting unit 14 is provided with a header generation unit 14A, a header holding unit 14B, and a header concatenating unit 14C.

The header generation unit 14A has a function of generating, for each UE, based on the allocation result obtained by the scheduling unit 12, a frame header for performing radio transmission of downlink data from the RRU to the corresponding UE by a radio frame.

The header holding unit 14B has a function of temporarily holding the headers generated by the header generation unit 14A.

The header concatenating unit 14C has a function of generating header data by collecting the headers held in the header holding unit 14B for each transmission source RRU and concatenating them.

Figure 12:
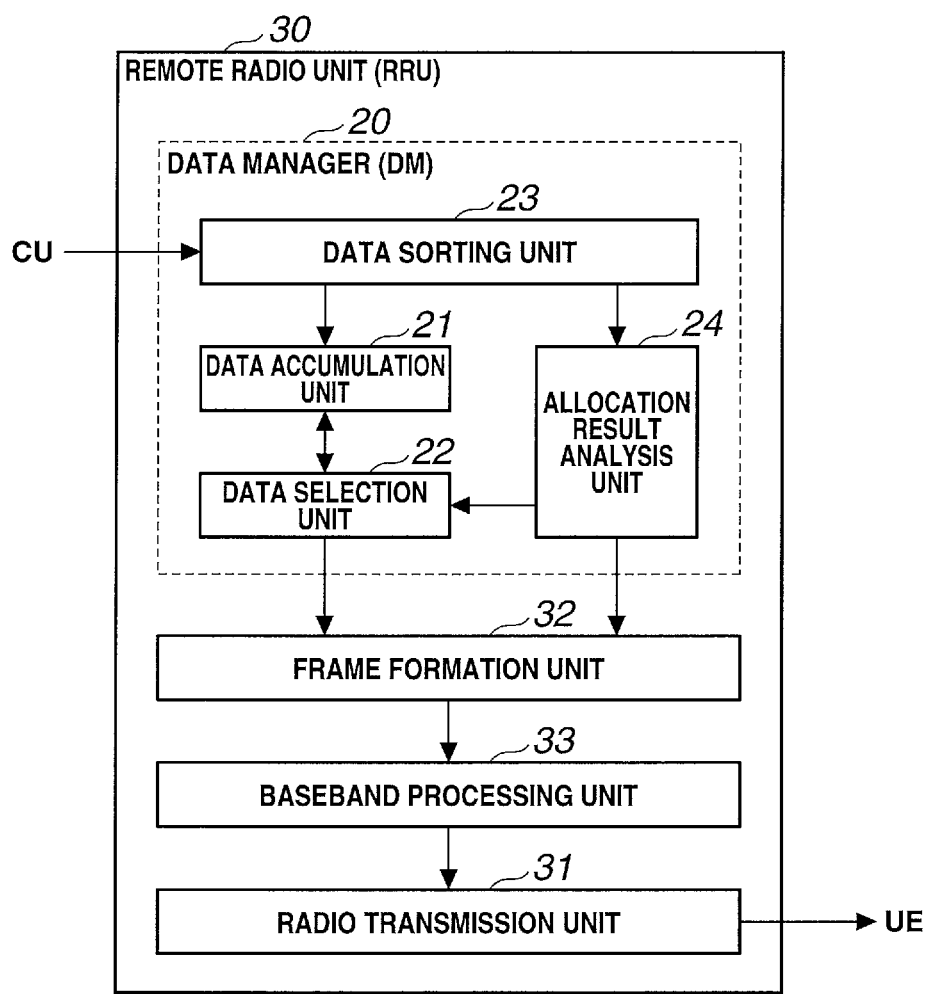
FIG. 12 is a block diagram showing the detailed arrangement of an RRU according to the fourth embodiment.
Figure 18:
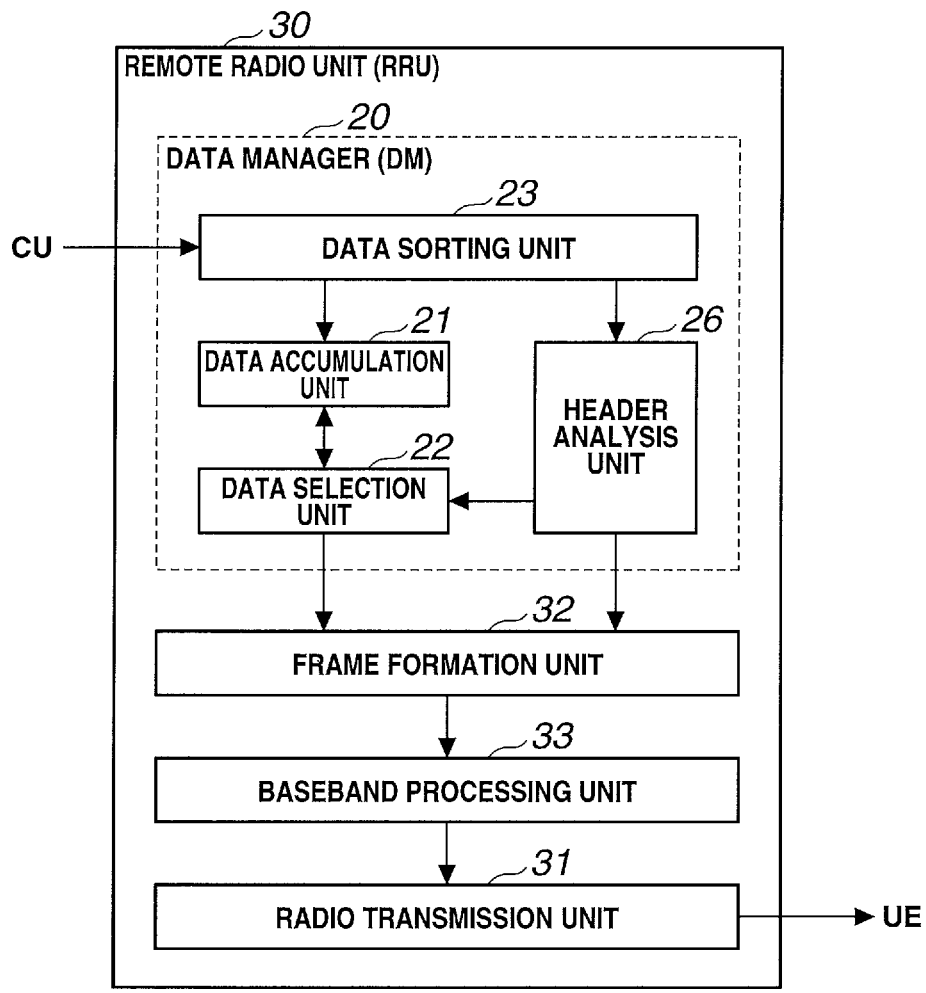
FIG. 18 is a block diagram showing the detailed arrangement of an RRU according to the seventh embodiment.

As shown in FIG. 18, each RRU according to this embodiment has an arrangement obtained by providing a header analysis unit 26 instead of the allocation result analysis unit 24 in the arrangement shown in FIG. 12 described above.

The header analysis unit 26 has a function of separating the header data received from the CU into respective headers, a function of notifying a data selection unit 22 of the destination UE of each separated header, the transmission source RRU, and the data length described in the header, and a function of outputting the headers of the destination UEs whose transmission source is the self RRU among the separated headers.

A frame formation unit 32 has a function of forming radio frames based on the headers from the header analysis unit 26 and downlink data corresponding to the headers selected by the data selection unit 22.

[Operation of Seventh Embodiment]

The operation of the radio network system 1 according to this embodiment will be described next.

[Downlink Data Broadcasting Operation in CU]

An operation in the CU during scheduling is the same as that according to the fourth embodiment but an operation after scheduling is different. Upon completion of scheduling, every time the scheduling unit 12 notifies the CU of an allocation result, the CU causes the header generation unit 14A to generate a header for each destination UE, and causes the header holding unit 14B to classify the headers in accordance with the destination UEs and hold them.

Upon completion of generation and holding of all the headers based on the allocation result, the header concatenating unit 14C acquires, from the header holding unit 14B, headers having the same transmission source RRU based on the allocation result, and concatenates the headers to generate one header data.

Figure 19:
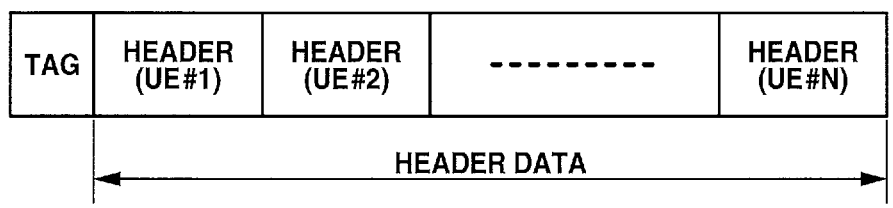
FIG. 19 is a view showing an example of the structure of header data.
Figure 20:
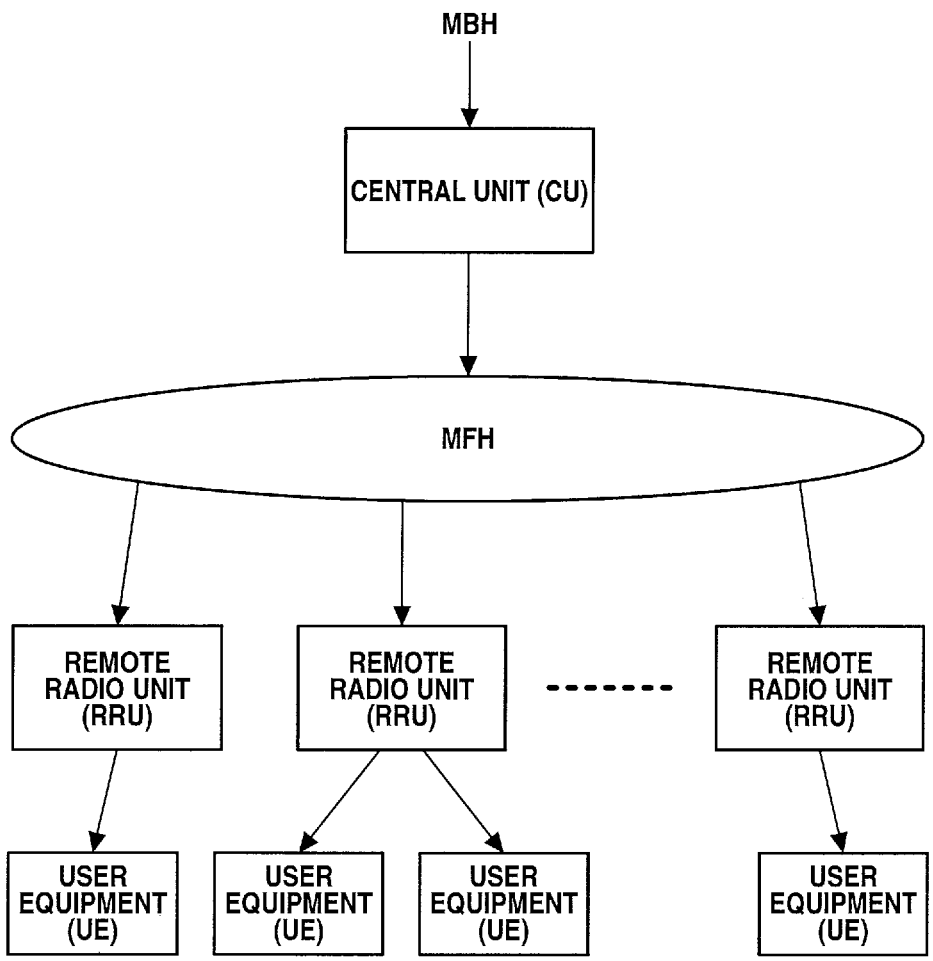
FIG. 20 is a view showing an example of the configuration of a radio network system for performing cooperative transmission of cells.
Figure 21:
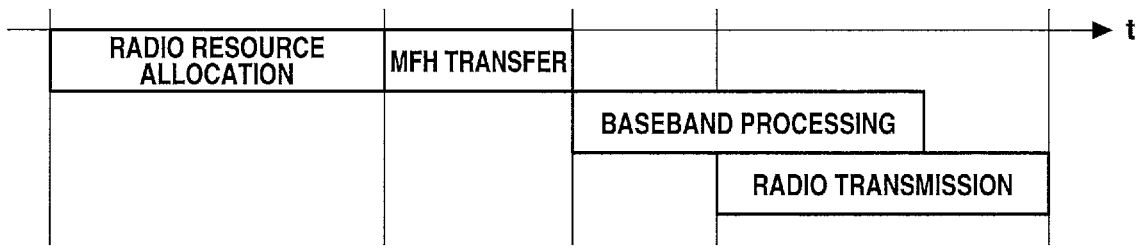
FIG. 21 is a timing chart showing downlink data transfer processing between a CU and an RRU in association with FIG. 20.

As shown in FIG. 19, the header concatenating unit 14C assigns a tag associated with the header data at the beginning of the header data. This tag includes, for example, a flag indicating the header data, the transmission source RRU of the downlink data, the number of concatenated headers, and information capable of identifying the destination UE of each header and the data length of the header.

A broadcasting control unit 13 encapsulates, by, for example, Ethernet, the header data generated by the header concatenating unit 14C for each transmission source RRU, and broadcasts it to all the DMs.

[Downlink Data Reception Operation in DM]

A downlink data reception operation in each DM (RRU) is the same as that according to the fourth embodiment but an operation when receiving the header data from the CU after completion of scheduling is different.

If each DM receives the header data from the CU, the header analysis unit 26 is notified of the header data via the data sorting unit 23. The header analysis unit 26 confirms the transmission source RRU with reference to the tag of the header data, and confirms whether the header data has the self RRU as the transmission source.

If the header data has the self RRU as the transmission source, the header analysis unit 26 separates the header data into headers based on the number of concatenated headers and the data lengths of the headers, which are described in the tag.

After that, the header analysis unit 26 acquires the data lengths described in the separated headers, and notifies the data selection unit 22 of the data length for each header together with the destination UE of the corresponding header while notifying the frame formation unit 32 of each header together with its destination UE.

The data selection unit 22 acquires corresponding downlink data from the data accumulation unit 21 based on the destination UE and data length sent from the header analysis unit 26, and notifies the frame formation unit 32 of the downlink data together with the corresponding destination UE.

For each destination UE, the frame formation unit 32 forms a radio frame by concatenating the headers sent from the data selection unit 22 with the downlink data. The formed radio frame undergoes baseband processing in a baseband processing unit 33, and undergoes radio transmission from the radio transmission unit 31 to the corresponding UE.

On the other hand, if the header data whose transmission source is not the self RRU is received, the header analysis unit 26 notifies the data selection unit 22 that the header data is data confirmed to be transferred from another RRU, together with the destination UEs and data lengths of the headers.

In response to this, the data selection unit 22 erases the corresponding downlink data from the data accumulation unit 21.

In this embodiment, the header data is data obtained by concatenating the headers of a plurality of radio frames having the same transmission source RRU. However, each data may be transferred by assigning a tag. Alternatively, the header data may include an allocation result.

[Effect of Seventh Embodiment]

As described above, in this embodiment, in the CU, the header broadcasting unit 14 generates, for each UE, based on the allocation result obtained by the scheduling unit 12, a frame header for performing radio transmission of downlink data from the RRU to the corresponding UE by a radio frame, and broadcasts the frame header to the DMs. In each DM, the data selection unit 22 selects, based on the frame headers broadcast from the CU, the downlink data allocated to the radio resource of the corresponding RRU from the downlink data accumulated in the data accumulation unit 21, and transfers the downlink data to the corresponding RRU together with the frame header which is selected from the frame headers and corresponding to the corresponding RRU. Based on the frame header selected in the DM, for each of UEs as the destinations of the downlink data selected in the DM, a radio transmission unit 31 of the RRU adds the frame header to the downlink data and performs radio transmission of the downlink data.

With this arrangement, the CU broadcasts the frame headers to the DMs (RRUs) instead of the allocation result obtained by scheduling. Therefore, when generating a radio frame in the RRU, it is unnecessary to generate a frame header based on the allocation result. Consequently, it is possible to reduce the processing load of the RRU and shorten the transmission delay time of the downlink data in the RRU.

Extension of Embodiments

The present invention has been described above with reference to the embodiments, but is not limited to these embodiments. Various changes understandable by those skilled in the art can be made for the arrangements and details of the present invention without departing from the scope of the invention. In addition, the embodiments can be arbitrarily combined and implemented within a consistent range.

More specifically, the method of estimating the untransmitted data amount according to the second embodiment and the third embodiment have been described by exemplifying a case in which the present invention is applied to the arrangement according to the second embodiment in which a DM is implemented in each ONU. However, the present invention may be applied to the arrangement according to the fourth embodiment in which a DM is implemented in each RRU.

On the other hand, the fifth to seventh embodiments have been described by exemplifying a case in which the present invention is applied to the arrangement according to the fourth embodiment. However, the present invention may be applied to the arrangement according to the second embodiment.

EXPLANATION OF THE REFERENCE NUMERALS AND SIGNS

1 . . . radio network system, 10, CU . . . central unit, 11 . . . data broadcasting unit, 11A . . . manipulation processing unit, 11B . . . data buffer, 11C . . . tag assignment unit, 11D . . . mirror buffer, 12 . . . scheduling unit, 13 . . . broadcasting control unit, 14 . . . header broadcasting unit, 14A . . . header generation unit, 14B . . . header holding unit, 14C . . . header concatenating unit, 20, DM . . . data manager, 21 . . . data accumulation unit, 21A . . . buffer A, 21B . . . buffer B, 22 . . . data selection unit, 23 . . . data sorting unit, 24 . . . allocation result analysis unit, 25 . . . transfer processing unit, 26 . . . header analysis unit, 30, RRU . . . remote radio unit, 31 . . . radio transmission unit, 32 . . . frame formation unit, 33 . . . baseband processing unit, 41, OLT . . . optical line terminal, 42, ONU . . . optical network unit, UE . . . user equipment

The invention claimed is:

1. A radio network system comprising:
   a central unit;
   a plurality of data managers connected to the central unit; and
   one or more remote radio units that are connected with the respective data managers and each performs radio communication with a corresponding user terminal,
   the central unit comprising a data broadcasting unit that broadcasts, to the data managers via mobile front-haul, downlink data destined for user terminals received from a host network, and a scheduling unit that executes scheduling for allocating radio resources of the remote radio units to radio transmission of the downlink data simultaneously with broadcasting of the downlink data,
   the data managers each comprising a data accumulation unit that temporarily accumulates the downlink data broadcast from the central unit, and a data selection unit that selects, based on an allocation result obtained by the scheduling, downlink data allocated to the radio resource of a corresponding remote radio unit, which corresponds to the self data manager among the remote radio units, from the downlink data accumulated in the data accumulation unit, transfers the selected downlink data to the corresponding remote radio unit, and discards, from the data accumulation unit, the downlink data allocated to the radio resources of the remote radio units other than the corresponding remote radio unit, and
   the remote radio units each comprising a radio transmission unit that performs, based on the allocation result obtained by the scheduling, radio transmission of the downlink data transferred from the data manager to the corresponding user terminal using the designated radio resource.

2. The radio network system according to claim 1, wherein the scheduling unit of the central unit estimates, for each of the user terminals, an untransmitted data amount about the downlink data destined for the user terminals by subtracting an allocated data amount of the downlink data destined for the user terminals allocated in immediately preceding allocation result from a sum of a remaining data amount of the downlink data destined for the user terminals remaining in the data broadcasting unit and a broadcast data amount of the downlink data destined for the user terminals broadcast to the data managers, and executes new scheduling based on the obtained estimated value of the untransmitted data amount.

3. The radio network system according to claim 1 or 2, wherein
when broadcasting the downlink data, the data broadcasting unit of the central unit broadcasts the downlink data by assigning, to the downlink data, a tag for identifying a destination user terminal of the downlink data,
when accumulating the downlink data, the data accumulation unit of each of the data managers accumulates, based on the tag assigned to the downlink data, the downlink data, from which the tag has been removed, in a user terminal-specific buffer corresponding to the tag, and
the data selection unit of each of the data managers selects the downlink data accumulated in the user terminal-specific buffer corresponding to the corresponding remote radio unit among the user terminal-specific buffers, transfers the selected downlink data to the corresponding remote radio unit, and discards the downlink data accumulated in the user terminal-specific buffers corresponding to the remote radio units other than the corresponding remote radio unit.

4. The radio network system according to claim 1, wherein
the data broadcasting unit of the central unit holds, in a user terminal-specific mirror buffer, downlink data identical to the downlink data destined for the user terminals accumulated in the data manager by holding, in the user terminal-specific mirror buffer, the downlink data broadcast to the data managers, and deleting, from the user terminal-specific mirror buffer, the downlink data which have been allocated to the radio resources by the scheduling, and limits broadcasting of the downlink data destined for the user terminals to the user terminals for which an accumulation amount of the downlink data held in the user terminal-specific mirror buffer is not smaller than a predetermined central unit threshold.

5. The radio network system according to claim 1, wherein
the data broadcasting unit of the central unit accumulates each downlink data received from the host network in the user terminal-specific buffer corresponding to the destination user terminal of the downlink data, reads out and broadcasts the downlink data accumulated in each user terminal-specific buffer to the data managers until radio resource allocation by the scheduling is completed, notifies each data manager of a new allocation result obtained upon completion of allocation, and discards, from the user terminal-specific buffers, the downlink data which have been allocated, and
the data selection unit of each of the data managers selects, based on the allocation result sent from the central unit, the downlink data allocated to the radio resource of the corresponding remote radio unit from the downlink data accumulated in the data accumulation unit, and discards the remaining unselected downlink data from the data accumulation unit.

6. The radio network system according to claim 1, wherein
the data accumulation unit of each of the data managers includes a buffer with a dual-buffer architecture as a buffer that accumulates the downlink data, and allocates one of the buffers to a standby buffer and the other buffer to an operating buffer before the new allocation result obtained by the scheduling is sent from the central unit, accumulates the downlink data transferred from the central unit in the standby buffer, and switches between the standby buffer and the operating buffer every time the new allocation result is sent, and
when selecting the downlink data, the data selection unit selects, based on the allocation result, the downlink data from the buffer allocated to the operating buffer of the buffers, and removes, after completion of selection, all the downlink data accumulated in the buffer allocated to the operating buffer.

7. The radio network system according to claim 1, wherein
the central unit further includes a header broadcasting unit that generates, for each of the user terminals, based on the allocation result, a frame header for performing radio transmission of the downlink data from the remote radio units to the corresponding user terminal by a radio frame, and broadcasts the frame header to the data managers,
the data selection unit of each of the data managers selects, based on the frame headers broadcast from the central unit, the downlink data allocated to the radio resource of the corresponding remote radio unit from the downlink data accumulated in the data accumulation unit, and selects the frame header corresponding to the corresponding remote radio unit from the frame headers, and
for each of the user terminals as the destinations of the downlink data selected by the data manager, the radio transmission units of the remote radio units perform radio transmission by assigning the frame header to the downlink data based on the frame header selected by the data manager.

8. The radio network system according to claim 1, wherein
the scheduling unit of the central unit generates, for each of the remote radio units, based on wideband CQIs (Channel Quality Indicators) periodically sent from the user terminals, radio channel information indicating the user terminals connected to the remote radio units, and notifies the data manager of the radio channel information, and
the data accumulation unit of each of the data managers confirms the destination user terminal of the downlink data upon receiving the downlink data sequentially broadcast from the central unit, and discards the downlink data before temporarily accumulating the downlink data, if the radio channel information about the corresponding remote radio unit, among the pieces of radio channel information sent from the central unit, includes no destination user terminal.

9. The radio network system according to claim 1, wherein the data managers are implemented in each of the remote radio units.

10. The radio network system according to claim 1, wherein
the mobile front-haul comprises a TDM-PON system including one optical line terminal connected to the central unit and a plurality of optical network units accommodated in the optical line terminal via optical fibers, and the data managers are implemented in each of the optical network units.

11. The radio network system according to claim 10, wherein when broadcasting, to the remote radio units via the optical network units, the downlink data transferred from the central unit, the optical line terminal calculates, for each of the user terminals, an estimated remaining amount of the downlink data destined for the user terminals remaining in the remote radio units by subtracting an allocated data amount of the downlink data destined for the user terminals allocated in an allocation result obtained by immediately preceding scheduling from broadcast data amount of the downlink data destined for the user terminals broadcast from the optical line terminal to the remote radio units, and determines, based on a result of comparing the estimated remaining amount with a remote radio unit threshold of the user terminal-specific buffer provided in each of the remote radio units, whether the downlink data destined for the user terminals can be broadcast to the remote radio units.

12. The radio network system according to claim 11, wherein the remote radio unit threshold is a value smaller than a maximum accumulable data amount that can be accumulated in one user terminal-specific buffer provided in each of the remote radio units, and the maximum accumulable data amount is a maximum transmittable data amount that can undergo radio transmission from the remote radio units during a period of one cycle of the scheduling.

\* \* \* \* \*